US012755752B2

(12) United States Patent
Ishimaru et al.

(10) Patent No.: US 12,755,752 B2
(45) Date of Patent: Oct. 6, 2026

(54) ORAL FUNCTION EVALUATION DEVICE, ORAL FUNCTION EVALUATION SYSTEM, AND ORAL FUNCTION EVALUATION METHOD

(71) Applicant: Panasonic Intellectual Property Management Co., Ltd., Osaka (JP)

(72) Inventors: Masashi Ishimaru, Osaka (JP); Yaming Zhang, Hyogo (JP); Hiroki Kamei, Osaka (JP); Junko Nakajima, Osaka (JP); Jakusei Kiyosaki, Hyogo (JP); Yoshihiro Matsumura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 181 days.

(21) Appl. No.: 18/855,873

(22) PCT Filed: Mar. 24, 2023

(86) PCT No.: PCT/JP2023/011742
§ 371 (c)(1),
(2) Date: Oct. 10, 2024

(87) PCT Pub. No.: WO2023/203962
PCT Pub. Date: Oct. 26, 2023

(65) Prior Publication Data

US 2025/0322842 A1 Oct. 16, 2025

(30) Foreign Application Priority Data

Apr. 18, 2022 (JP) ................................ 2022-068302

(51) Int. Cl.
*G10L 25/66* (2013.01)
*A61B 5/08* (2006.01)
(Continued)

(52) U.S. Cl.
CPC .............. *G10L 25/66* (2013.01); *G10L 25/03* (2013.01)

(58) Field of Classification Search
CPC ......... G10L 25/03; G10L 25/15; G10L 25/21; G10L 25/66; G16H 15/00; G16H 15/30; A61B 5/08; A61B 5/087; A61C 19/04
(Continued)

(56) References Cited

U.S. PATENT DOCUMENTS 5,586,215 A 12/1996 Stork et al.
9,943,260 B2 * 4/2018 Bae .......................... A61B 5/18
(Continued)

FOREIGN PATENT DOCUMENTS

JP 59-099497 A 6/1984
JP 60-042799 A 3/1985
(Continued)

OTHER PUBLICATIONS

International Search Report dated Jun. 13, 2023 issued in International Patent Application No. PCT/JP2023/011742, with English translation.

*Primary Examiner* — Martin Lerner
(74) *Attorney, Agent, or Firm* — Rimon P.C.

(57) ABSTRACT

An oral function evaluation device includes: an obtainer that obtains voice data; an extractor that extracts a feature from the voice data; an S/N ratio calculator that calculates a signal-to-noise (S/N) ratio of a second average intensity of a sound collected in a period when a voice is uttered to a first average intensity of a sound collected in a period when no voice is uttered; a determiner that determines an estimating equation; and an evaluator that evaluates the deterioration state of oral function through assessment using an oral function evaluation indicator, based on the estimating equation determined and the feature extracted. As the estimating
(Continued)

equation, the determiner determines: a first estimating equation that includes a sound-pressure-related feature when the S/N ratio is greater than a first threshold; and a second estimating equation that does not include the sound-pressure-related feature when the S/N ratio is the first threshold or less.

11 Claims, 18 Drawing Sheets

(51) Int. Cl.
*G10L 25/03* (2013.01)
*G16H 50/30* (2018.01)

(58) Field of Classification Search
USPC ........ 704/205, 206, 209, 270; 600/529, 532, 600/590
See application file for complete search history.

(56) References Cited

U.S. PATENT DOCUMENTS

| | | | | |
|---|---|---|---|---|
| 10,796,715 | B1 * | 10/2020 | Berisha | A61B 5/4848 |
| 11,918,372 | B2 * | 3/2024 | Sumi | G10L 25/66 |
| 12,350,065 | B2 * | 7/2025 | Matsumura | G09B 19/04 |
| 12,573,394 | B2 * | 3/2026 | Ishimaru | G10L 15/22 |
| 2021/0298711 | A1 * | 9/2021 | Miri | G16H 50/20 |
| 2022/0079511 | A1 * | 3/2022 | Quatieri | G10L 25/24 |
| 2022/0108704 | A1 * | 4/2022 | Elmalem | G16H 40/67 |
| 2022/0293239 | A1 * | 9/2022 | Nakajima | A61B 5/4803 |
| 2024/0268705 | A1 * | 8/2024 | Ishimaru | G16H 20/00 |
| 2025/0006179 | A1 * | 1/2025 | Kamei | A61B 5/4542 |
| 2025/0095644 | A1 * | 3/2025 | Ishimaru | G10L 15/22 |
| 2025/0316284 | A1 * | 10/2025 | Ishimaru | G10L 25/66 |

FOREIGN PATENT DOCUMENTS

| | | | | | |
|---|---|---|---|---|---|
| JP | 06-043897 | A | | 2/1994 | |
| JP | 06-124097 | A | | 5/1994 | |
| JP | 2017-023676 | A | | 2/2017 | |
| JP | 2018-050847 | A | | 4/2018 | |
| MY | 208960 | A | * | 6/2025 | G10L 25/15 |
| WO | 2019/216320 | A1 | | 11/2019 | |
| WO | 2019/225241 | A1 | | 11/2019 | |
| WO | WO-2019225242 | A1 | * | 11/2019 | G10L 25/15 |
| WO | WO-2021166695 | A1 | * | 8/2021 | A61B 5/4803 |
| WO | WO-2022254973 | A1 | * | 12/2022 | G10L 25/15 |
| WO | WO-2023228615 | A1 | * | 11/2023 | G10L 25/03 |

* cited by examiner

FIG. 8

| Japanese | Chinese | |
|---|---|---|
| Japanese text | Chinese text | Pinyin |
| "e o kaku koto ni kimeta yo" | 高島屋打卡即刻打一五折 | gāo dǎo wū dá kǎ jí kè dǎ yī wǔ zhé |
| "kara, kara, kara ..." | 「卡拉, 卡拉, 卡拉」 | kǎ lā kǎ lā kǎ lā |
| "sara, sara, sara ..." | 「萨拉, 萨拉, 萨拉」 | sà lā sà lā sà lā |
| "eo eo eo" | 「一五 一五 一五」 | yī wǔ yī wǔ yī wǔ |
| "iea iea iea" | 「伊俄啊 伊俄啊 伊俄啊」 | yī é ā yī é ā yī é ā |
| "ai ai ai" | 「啊伊 啊伊 啊伊」 | ā yī ā yī ā yī ā yī |
| "aei aei aei" | 「啊俄伊 啊俄伊 啊俄伊」 | ā é yī ā é yī ā é yī |
| "ippai ippai ippai" | 「一派, 一派, 一派」 | yí pài yí pài yí pài |
| "ittai ittai ittai" | 「一太, 一太, 一太」 | yí tài yí tài yí tài |
| "ikkai ikkai ikkai" | 「一开, 一开, 一开」 | yì kāi yì kāi yì kāi |

FIG. 9B

| | Bilabial | Labiodental | Dental | Alveolar | Postalveolar | Retroflex | Palatal | Velar | Uvular | Pharyngeal | Glottal |
|---|---|---|---|---|---|---|---|---|---|---|---|
| Plosive | p b | | | t d | | ʈ ɖ | c ɟ | k g | q ɢ | | ʔ |
| Nasal | m | ɱ | | n | | ɳ | ɲ | ŋ | ɴ | | |
| Trill | ʙ | | | r | | | | | ʀ | | |
| Tap or Flap | | | | ɾ | | ɽ | | | | | |
| Fricative | ɸ β | f v | θ ð | s z | ʃ ʒ | ʂ ʐ | ç ʝ | x ɣ | χ ʁ | ħ ʕ | h ɦ |
| Lateral fricative | | | | ɬ ɮ | | | | | | | |
| Approximant | | ʋ | | ɹ | | ɻ | j | ɰ | | | |
| Lateral approximant | | | | l | | ɭ | ʎ | ʟ | | | |

FIG. 11

| Oral function | Indicator |
|---|---|
| Oral hygiene | 50% or more |
| Oral dryness | 27 or less |
| Occlusal force | Less than 200 N |
| Tongue pressure | Less than 30 kPa |
| Mastication function | Less than 100 mg/dL |

FIG. 12

| Oral function | Evaluation result |
|---|---|
| Mouth cleanliness | NG |
| Bolus formation ability | NG |
| Force for biting hard things | OK |
| Tongue force | NG |
| Jaw movement | NG |

| Oral function | Evaluation result | Suggestion |
|---|---|---|
| Mouth cleanliness | OK | ··· |
| Bolus formation ability | NG | ··· |
| Force for biting hard things | NG | ··· |
| Tongue force | NG | ··· |
| Jaw movement | OK | ··· |

ORAL FUNCTION EVALUATION DEVICE, ORAL FUNCTION EVALUATION SYSTEM, AND ORAL FUNCTION EVALUATION METHOD

CROSS-REFERENCE TO RELATED APPLICATIONS

This application is the U.S. National Phase under 35 U.S.C. § 371 of International Patent Application No. PCT/JP2023/011742, filed on Mar. 24, 2023, which in turn claims the benefit of Japanese Patent Application No. 2022-068302, filed on Apr. 18, 2022, the entire disclosures of which Applications are incorporated by reference herein.

TECHNICAL FIELD

The present invention relates to an oral function evaluation device, an oral function evaluation system, and an oral function evaluation method that can evaluate oral function of an evaluatee.

BACKGROUND ART

A method for evaluating the eating and swallowing function of an evaluatee by obtaining a pharynx movement feature as an eating and swallowing function evaluation indicator (marker) from an appliance which is put on the neck of the evaluatee to evaluate the eating and swallowing function is disclosed (e.g., see Patent Literature (PTL) 1).

CITATION LIST

Patent Literature

[PTL 1] Japanese Unexamined Patent Application Publication No. 2017-23676

SUMMARY OF INVENTION

Technical Problem

However, the method disclosed in PTL 1 requires an evaluatee to put on the appliance to evaluate oral function such as eating and swallowing function. This may cause discomfort to the evaluatee and impose a burden on the evaluatee. Oral function can be evaluated also by visual inspection, interview, palpation, or the like by a specialist such as a dentist, a dental hygienist, a speech pathologist, or a physician. However, deterioration in the oral function of an elderly person may be overlooked, being regarded as a natural symptom of an elderly person, although the elderly person chokes all the time or spills food because of an influence of aging. Overlooking deterioration in the oral function brings about, for example, undernutrition resulting from a decrease in an amount of food intake, and the undernutrition brings about a decrease in immune strength. In addition, deterioration in the oral function tends to cause aspiration, and as a result, the aspiration and the decrease in immune strength bring about a vicious circle that leads to a risk of aspiration pneumonia.

Even without use of such a method, oral function of an evaluatee can be evaluated from a voice uttered by the evaluatee; however, there has been an issue with the evaluation accuracy due to inability to properly collect the voice.

In view of this, it is an object of the present invention to provide an oral function evaluation device and so on capable of evaluating oral function more accurately while using a voice of an evaluatee.

Solution to Problem

An oral function evaluation device according to an aspect of the present invention is an oral function evaluation device that evaluates a deterioration state of oral function of an evaluatee from a voice uttered by the evaluatee, the oral function evaluation device including: an obtainer that obtains voice data obtained by collecting a voice uttered by the evaluatee; an extractor that extracts one or more features from the voice data obtained; an S/N ratio calculator that, using the voice data obtained, calculates a first average intensity of a sound collected in a period in which the evaluatee does not utter a voice and a second average intensity of a sound collected in a period in which the evaluatee utters a voice, and calculates a signal-to-noise (S/N) ratio that is a ratio of the second average intensity to the first average intensity; a determiner that determines an estimating equation to be used for evaluation of the oral function of the evaluatee; a calculator that calculates an estimate value of the oral function of the evaluatee, based on the estimating equation determined and the one or more features extracted; and an evaluator that evaluates the deterioration state of the oral function of the evaluatee by assessing the estimate value using an oral function evaluation indicator, wherein the determiner: determines a first estimating equation as the estimating equation when the S/N ratio calculated is greater than a first threshold, the first estimating equation being an estimating equation that includes a feature related to sound pressure among the one or more features extracted from the voice data; and determines a second estimating equation as the estimating equation when the S/N ratio calculated is less than or equal to the first threshold, the second estimating equation being an estimating equation that does not include the feature related to sound pressure.

An oral function evaluation system according to an aspect of the present invention is an oral function evaluation system that evaluates a deterioration state of oral function of an evaluatee from a voice uttered by the evaluatee, the oral function evaluation system including: a terminal; and an oral function evaluation device connected to the terminal, wherein the terminal includes: a sound collection device used for collecting a voice uttered by the evaluatee; and a presentation device that presents the deterioration state of the oral function of the evaluatee evaluated, the oral function evaluation device includes: an obtainer that obtains voice data obtained by collecting the voice uttered by the evaluatee; an extractor that extracts one or more features from the voice data obtained; an S/N ratio calculator that, using the voice data obtained, calculates a first average intensity of a sound collected in a period in which the evaluatee does not utter a voice and a second average intensity of a sound collected in a period in which the evaluatee utters a voice, and calculates a signal-to-noise (S/N) ratio that is a ratio of the second average intensity to the first average intensity; a determiner that determines an estimating equation to be used for evaluation of the oral function of the evaluatee; a calculator that calculates an estimate value of the oral function of the evaluatee, based on the estimating equation determined and the one or more features extracted; and an evaluator that evaluates the deterioration state of the oral function of the evaluatee by assessing the estimate value using an oral function evaluation indicator, and the determiner: determines a first estimating equation as the estimating equation when the S/N ratio calculated is greater than a first threshold, the first estimating equation being an estimating equation that includes a feature related to sound pressure among the one or more features extracted from the voice data; and determines a second estimating equation as the estimating equation when the S/N ratio calculated is less than or equal to the first threshold, the second estimating equation being an estimating equation that does not include the feature related to sound pressure.

An oral function evaluation method according to an aspect of the present invention is an oral function evaluation method of evaluating a deterioration state of oral function of an evaluatee from a voice uttered by the evaluatee, the oral function evaluation method being a method to be performed by a terminal and an oral function evaluation device and including: obtaining voice data by the terminal collecting a voice uttered by the evaluatee; obtaining, by the oral function evaluation device, the voice data; extracting, by the oral function evaluation device, one or more features from the voice data obtained; calculating, by the oral function evaluation device, using the voice data obtained, a first average intensity of a sound collected in a period in which the evaluatee does not utter a voice and a second average intensity of a sound collected in a period in which the evaluatee utters a voice, and calculating an S/N ratio that is a ratio of the second average intensity to the first average intensity; determining, by the oral function evaluation device, an estimating equation to be used for evaluation of the oral function of the evaluatee; calculating, by the oral function evaluation device, an estimate value of the oral function of the evaluatee, based on the estimating equation determined and the one or more features extracted; evaluating, by the oral function evaluation device, the deterioration state of the oral function of the evaluatee by assessing the estimate value using an oral function evaluation indicator; and presenting, by the terminal, the deterioration state of the oral function of the evaluatee evaluated, wherein the determining of the estimating equation includes: determining a first estimating equation as the estimating equation when the S/N ratio calculated is greater than a first threshold, the first estimating equation being an estimating equation that includes a feature related to sound pressure among the one or more features extracted from the voice data; and determining a second estimating equation as the estimating equation when the S/N ratio calculated is less than or equal to the first threshold, the second estimating equation being an estimating equation that does not include the feature related to sound pressure.

Advantageous Effects of Invention

With an oral function evaluation method and so on according to the present invention, it is possible to evaluate oral function more accurately while using a voice of an evaluatee.

BRIEF DESCRIPTION OF DRAWINGS

FIG. 6 is a graph illustrating an example of voice data indicating a voice of an evaluatee repeatedly uttering "karakarakara . . . "

FIG. 8 is a table showing an example of phrases and fixed sentences in Japanese and phrases and fixed sentences in Chinese that are similar in tongue movement or degree of mouth opening and closing when pronounced.

FIG. 9B is a table illustrating international phonetic alphabet symbols of consonants.

FIG. 11 is a diagram illustrating an example of oral function evaluation indicators.

FIG. 12 is a table illustrating an example of evaluation results on elements of oral function.

DESCRIPTION OF EMBODIMENTS

Figure 1:
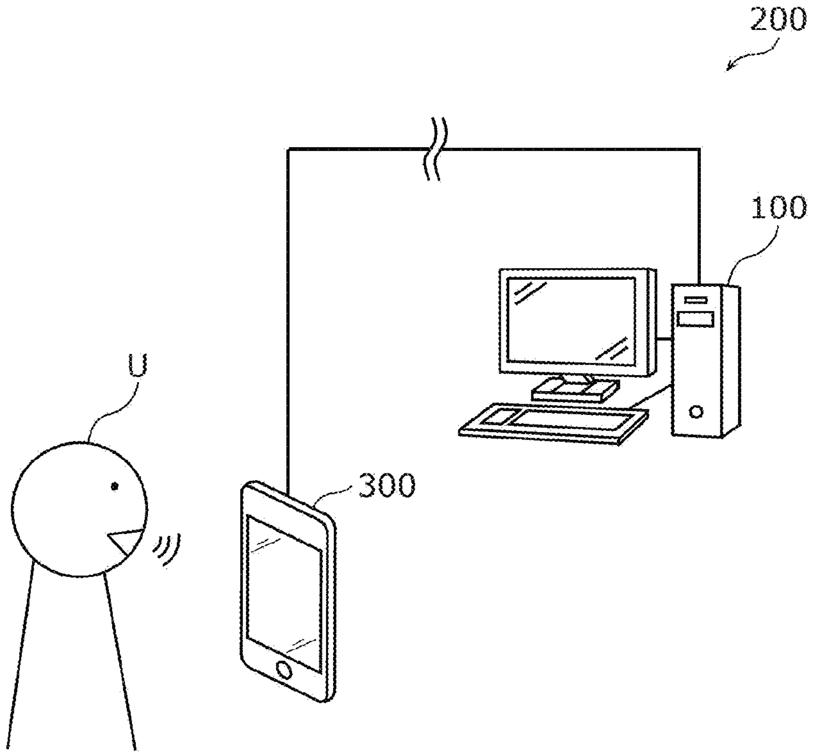
FIG. 1 is a diagram illustrating a configuration of an oral function evaluation system according to an embodiment.

Hereinafter, embodiments will be described with reference to the drawings. It should be noted that the following embodiments each illustrate a general or specific example. The numerical values, shapes, materials, constituent elements, the arrangement and connection of the constituent elements, steps, the processing order of the steps etc. illustrated in the following embodiments are mere examples, and are not intended to limit the present invention. Among the constituent elements in the following embodiments, those not recited in any of the independent claims representing the most generic concepts will be described as optional constituent elements.

It should be noted that the drawings are represented schematically and are not necessarily precise illustrations. Furthermore, in the drawings, constituent elements that are substantially the same are given the same reference signs, and redundant descriptions will be omitted or simplified.

Embodiment

[Elements of Oral Function]

The present invention relates to, for example, a method for evaluating deterioration of oral function, and oral function includes various elements.

For example, elements of oral function include tongue fur, oral dryness, occlusal force, tongue pressure, cheek pressure, the remaining number of teeth, swallowing function, mastication function, and so on. The following briefly describes tongue fur, oral dryness, occlusal force, tongue pressure, and mastication function.

The tongue fur indicates how much bacteria or food is deposited on the tongue (i.e., oral hygiene). No tongue fur or thin tongue fur shows that there is an environment of mechanical abrasion (food intake, etc.), cleaning action by saliva is present, or swallowing movement (tongue movement) is normal. In contrast, thick tongue fur shows poor tongue movement and a difficulty in taking food, which may bring about malnutrition or poor muscle strength. The oral dryness is a degree of how dry the tongue is, and when the tongue is dry, movement for speech is inhibited. Food is chewed after being taken into the oral cavity, and the food only chewed is difficult to swallow. Thus, to make it easy to swallow chewed food, saliva exercises a function of gathering the chewed food. However, when the oral cavity is dry, it is difficult to form a bolus (chewed food gathered). The occlusal force is the force for biting hard things and is the strength of jaw muscles. The tongue pressure is an indicator that expresses the force of the tongue pressing the palate. When the tongue pressure is weakened, it may be difficult to make movement of swallowing. Furthermore, when the tongue pressure is weakened, the speed of moving the tongue may decrease, and the speech rate may decrease. The mastication function is comprehensive function of the oral cavity.

According to the present invention, it is possible to evaluate a deterioration state of oral function (e.g., a deterioration state of an element of oral function) of an evaluatee from a voice uttered by the evaluatee. This is because a voice uttered by an evaluatee whose oral function is deteriorating has a specific feature, and by extracting the specific feature as a prosody feature, oral function of the evaluatee can be evaluated. The present invention is implemented by an oral function evaluation method, a program that causes a computer or the like to perform the method, an oral function evaluation device that is an example of the computer, and an oral function evaluation system that includes the oral function evaluation device. Hereinafter, the oral function evaluation method and the like will be described along with the oral function evaluation system.

[Configuration of Oral Function Evaluation System]

A configuration of oral function evaluation system 200 according to an embodiment will be described.

FIG. 1 is a diagram illustrating a configuration of oral function evaluation system 200 according to the embodiment.

Oral function evaluation system 200 is a system for evaluating oral function of evaluatee U by analyzing a voice of evaluatee U. As illustrated in FIG. 1, oral function evaluation system 200 includes oral function evaluation device 100 and mobile terminal 300 (an example of a terminal).

Oral function evaluation device 100 is a device that obtains voice data indicating a voice uttered by evaluatee U through mobile terminal 300 and evaluates oral function of evaluatee U from the voice data obtained.

Mobile terminal 300 is a sound collection device that collects in a contactless manner a voice of evaluatee U uttering a phrase or a fixed sentence that includes (i) two or more morae including a change in a first formant frequency or a change in a second formant frequency or (ii) at least one of a flap, a plosive, a voiceless sound, a double consonant, or a fricative, and outputs voice data indicating the collected voice to oral function evaluation device 100. For example, mobile terminal 300 is a smartphone or a tablet computer including a microphone. It should be noted that mobile terminal 300 is not limited to a smartphone, a tablet computer, or the like so long as it is a device having a sound collecting function. For example, mobile terminal 300 may be a laptop computer. Oral function evaluation system 200 may include a sound collection device (microphone) instead of mobile terminal 300. Oral function evaluation system 200 may include an input interface for obtaining personal information on evaluatee U. The input interface is not particularly limited so long as it is an input interface having an input function, such as a keyboard or a touch panel. Oral function evaluation system 200 may set the volume of the microphone.

Mobile terminal 300 may be a display device that includes a display and displays, for example, an image based on image data output from oral function evaluation device 100. That is to say, mobile terminal 300 is an example of a presentation device that presents, in the form of an image, information output from oral function evaluation device 100. It should be noted that the display device need not be mobile terminal 300 and may be a monitor device that includes a liquid crystal panel, an organic EL panel, or the like. In other words, although mobile terminal 300 serves as both a sound collection device and a display device in the present embodiment, the sound collection device (microphone), the input interface, and the display device may be provided separately.

It is sufficient so long as oral function evaluation device 100 and mobile terminal 300 are capable of transmitting and receiving, for example, image data for displaying an image indicating an evaluation result that will be described later or voice data. Thus, oral function evaluation device 100 and mobile terminal 300 may be connected in a wired manner or may be connected in a wireless manner.

Oral function evaluation device 100 analyzes a voice of evaluatee U based on voice data collected by mobile terminal 300, evaluates oral function of evaluatee U from a result of the analysis, and outputs an evaluation result. For example, oral function evaluation device 100 outputs, to mobile terminal 300, image data for displaying an image indicating the evaluation result or data for providing a suggestion to evaluatee U regarding oral function and generated based on the evaluation result. With this configuration, oral function evaluation device 100 can notify evaluatee U of a level of oral function and a suggestion for preventing deterioration of oral function, for example. Thus, evaluatee U can prevent deterioration of oral function or improve oral function, for example.

It should be noted that although oral function evaluation device 100 is, for example, a personal computer, it may be a server device. Further, oral function evaluation device 100 may be mobile terminal 300. That is to say, mobile terminal 300 may have the function of oral function evaluation device 100 described below.

Figure 2:
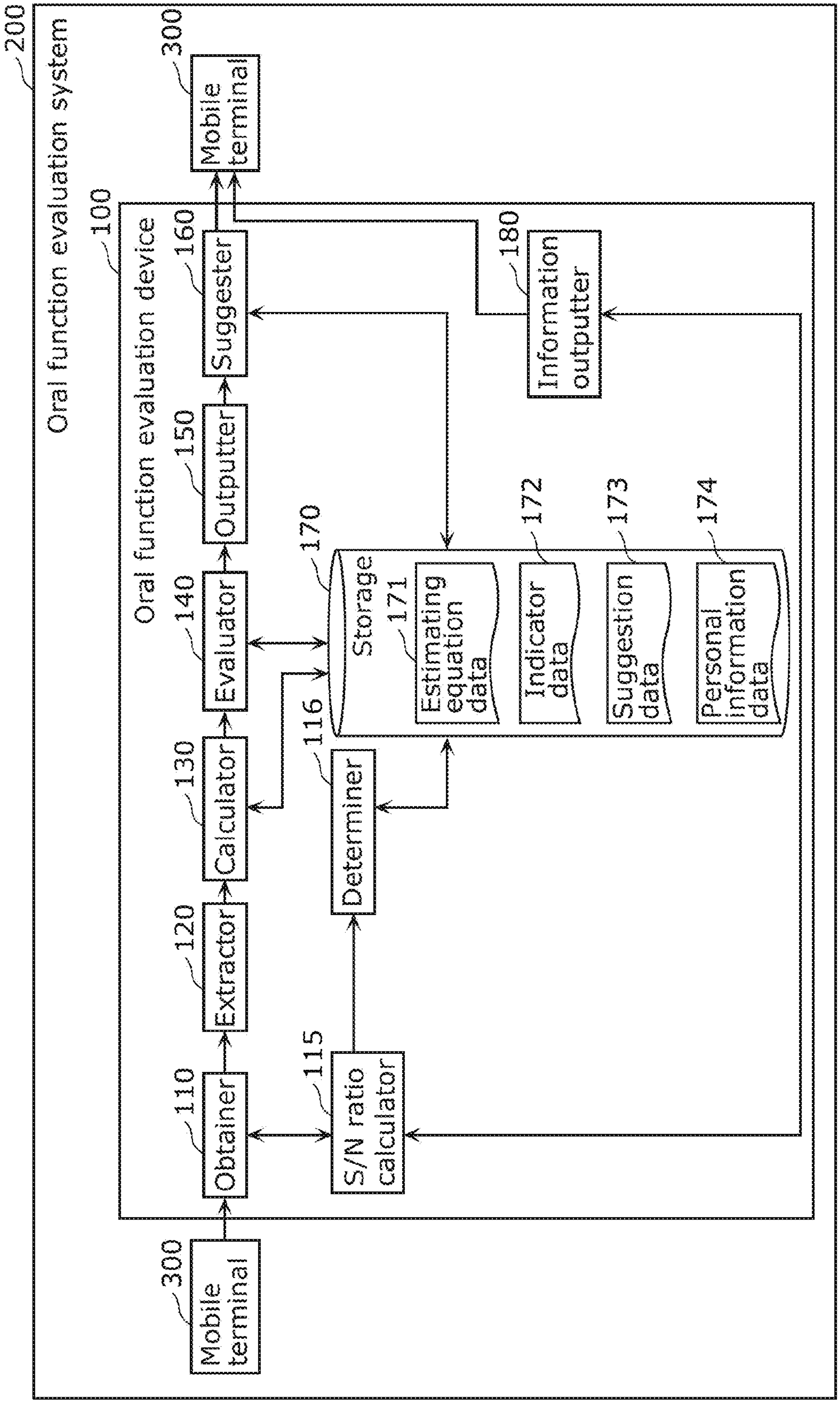
FIG. 2 is a block diagram illustrating a characteristic functional configuration of the oral function evaluation system according to the embodiment.

FIG. 2 is a block diagram illustrating a characteristic functional configuration of oral function evaluation system 200 according to the embodiment. Oral function evaluation device 100 includes obtainer 110, S/N (signal-to-noise) ratio calculator 115, determiner 116, extractor 120, calculator 130, evaluator 140, outputter 150, suggester 160, storage 170, and information outputter 180.

Obtainer 110 obtains voice data obtained by mobile terminal 300 collecting in a contactless manner a voice uttered by evaluatee U. The voice is a voice of evaluatee U uttering a phrase or a fixed sentence that includes two or more morae including a change in the first formant frequency or a change in the second formant frequency. Alternatively, the voice is a voice of evaluatee U uttering a phrase or a fixed sentence that includes at least one of a flap, a plosive, a voiceless sound, a double consonant, or a fricative. However, in some situations that will be described later, the voice may be a voice of evaluatee U uttering an arbitrary sentence. Obtainer 110 may further obtain personal information on evaluatee U. For example, the personal information is information input to mobile terminal 300 and includes age, weight, height, sex, body mass index (BMI), dental information (e.g., the number of teeth, whether a denture is used, occlusal support location, the number of functional teeth, and the remaining number of teeth), serum albumin level, or eating rate. It should be noted that the personal information may be obtained through a swallowing screening tool called the eating assessment tool-10 (EAT-10), Seirei dysphagia screening questionnaire, interview, Barthel Index, Kihon Checklist, or the like. Obtainer 110 is, for example, a communication interface that performs wired communication or wireless communication.

S/N ratio calculator 115 is a processing unit that calculates a signal-to-noise (S/N) ratio of the voice data obtained. The S/N ratio of the voice data is a ratio of a second average intensity of a sound collected in a period in which evaluatee U utters a voice in the voice data obtained to a first average intensity of a sound collected in a period in which evaluatee U does not utter a voice (a period in which only background noise is collected; hereinafter also referred to as a background noise period) in the voice data obtained. Therefore, S/N ratio calculator 115 is configured capable of calculating the first average intensity by extracting, from the voice data, a sound corresponding to the period in which evaluatee U does not utter a voice and calculating the second average intensity by extracting, from the voice data, a sound corresponding to the period in which evaluatee U utters a voice. Specifically, S/N ratio calculator 115 is implemented by a processor, a microcomputer, or a dedicated circuit.

Determiner 116 is a processing unit that determines an estimating equation to be used by calculator 130, which will be described later, when calculating an estimate value of oral function of evaluatee U based on the S/N ratio calculated by S/N ratio calculator 115. Specifically, in consideration of the influence of background noise assumed from the S/N ratio, determiner 116 determines an estimating equation to be used for estimation, from among several candidate estimating equations including at least a first estimating equation and a second estimating equation that are set in advance. It should be noted that the candidate estimating equations are calculated in advance based on a plurality of training data items and stored in, for example, storage 170. Determiner 116 determines, from among the candidate estimating equations stored in storage 170, an estimating equation to be used for estimation, and stores the determined estimating equation separately as estimating equation data 171 in storage 170. Specifically, determiner 116 is implemented by a processor, a microcomputer, or a dedicated circuit.

Extractor 120 is a processing unit that analyzes voice data of evaluatee U obtained by obtainer 110. Specifically, extractor 120 is implemented by a processor, a microcomputer, or a dedicated circuit.

Extractor 120 calculates a prosody feature from voice data obtained by obtainer 110. The prosody feature is a numerical value indicating a feature of a voice of evaluatee U extracted from voice data used by evaluator 140 to evaluate oral function of evaluatee U. The prosody feature may include at least one of the speech rate, a sound pressure difference, a change over time in the sound pressure difference, the first formant frequency, the second formant frequency, an amount of change in the first formant frequency, an amount of change in the second formant frequency, a change over time in the first formant frequency, a change over time in the second formant frequency, or a time length of a plosive.

Calculator 130 calculates an estimate value of oral function of evaluatee U, based on the prosody feature extracted by extractor 120 and the estimating equation determined. Specifically, calculator 130 is implemented by a processor, a microcomputer, or a dedicated circuit.

Evaluator 140 evaluates a deterioration state of oral function of evaluatee U by assessing, using an oral function evaluation indicator, the estimate value calculated by calculator 130. Indicator data 172 indicating the oral function evaluation indicator is stored in storage 170. Specifically, evaluator 140 is implemented by a processor, a microcomputer, or a dedicated circuit.

Outputter 150 outputs the estimate value calculated by calculator 130 to suggester 160. Outputter 150 may output an evaluation result on oral function of evaluatee U evaluated by evaluator 140 to mobile terminal 300, for example. Specifically, outputter 150 is implemented by a processor, a microcomputer, or a dedicated circuit, and a communication interface that performs wired communication or wireless communication.

Suggester 160 provides a suggestion regarding oral function of evaluatee U by checking the estimate value calculated by calculator 130 against predetermined data. Suggestion data 173, which is the predetermined data, is stored in storage 170. Suggester 160 may provide a suggestion regarding oral function to evaluatee U by checking, against suggestion data 173, the personal information obtained by obtainer 110. Suggester 160 outputs the suggestion to mobile terminal 300. Suggester 160 is implemented by, for example, a processor, a microcomputer, or a dedicated circuit, and a communication interface that performs wired communication or wireless communication.

Storage 170 is a storage device in which the following data are stored: data (not illustrated) on candidates for oral function estimating equations calculated based on a plurality of training data items; estimating equation data 171 indicating the estimating equation determined by determiner 116; indicator data 172 indicating the oral function evaluation indicator used for assessing the estimate value of oral function of evaluatee U; suggestion data 173 indicating a relationship between the estimate value of oral function and suggestion details; and personal information data 174 indicating the above-described personal information on evaluatee U. Estimating equation data 171 is referred to by calculator 130 when calculating an estimate value of oral function of evaluatee U. Indicator data 172 is referred to by evaluator 140 when evaluating a deterioration state of oral function of evaluatee U. Suggestion data 173 is referred to by suggester 160 when providing a suggestion regarding oral function to evaluatee U. Personal information data 174 is, for example, data obtained via obtainer 110. It should be noted that personal information data 174 may be stored in storage 170 in advance. Storage 170 is implemented by, for example, read-only memory (ROM), random-access memory (RAM), semiconductor memory, hard disk drive (HDD), or the like.

Information outputter 180 is a processing unit that outputs information for increasing the S/N ratio. When the calculated S/N ratio does not meet a certain criterion, information outputter 180 generates and outputs information indicating an instruction to improve the environment in which a voice uttered by evaluatee U is collected. Specifically, information outputter 180 is implemented by a processor, a microcomputer, or a dedicated circuit.

Storage 170 may also store: a program executed by a computer to implement S/N ratio calculator 115, determiner 116, extractor 120, calculator 130, evaluator 140, outputter 150, suggester 160, and information outputter 180; image data indicating an evaluation result on oral function of evaluatee U and used when the evaluation result is output; and data such as an image, video, voice, or text indicating details of a suggestion. Storage 170 may store an instruction image that will be described later.

Although not illustrated, oral function evaluation device 100 may include an instructor that instructs evaluatee U to utter a phrase or a fixed sentence that includes (i) two or more morae including a change in the first formant frequency or a change in the second formant frequency or (ii) at least one of a flap, a plosive, a voiceless sound, a double consonant, or a fricative. Specifically, the instructor obtains image data on an instruction image or voice data on an instruction voice that is stored in storage 170 and that instructs evaluatee U to utter the phrase or the fixed sentence, and the instructor outputs the image data or the voice data to mobile terminal 300.

[Processing Procedure of Oral Function Evaluation Method]

Now, a specific processing procedure of an oral function evaluation method executed by oral function evaluation device 100 will be described.

Figure 3A:
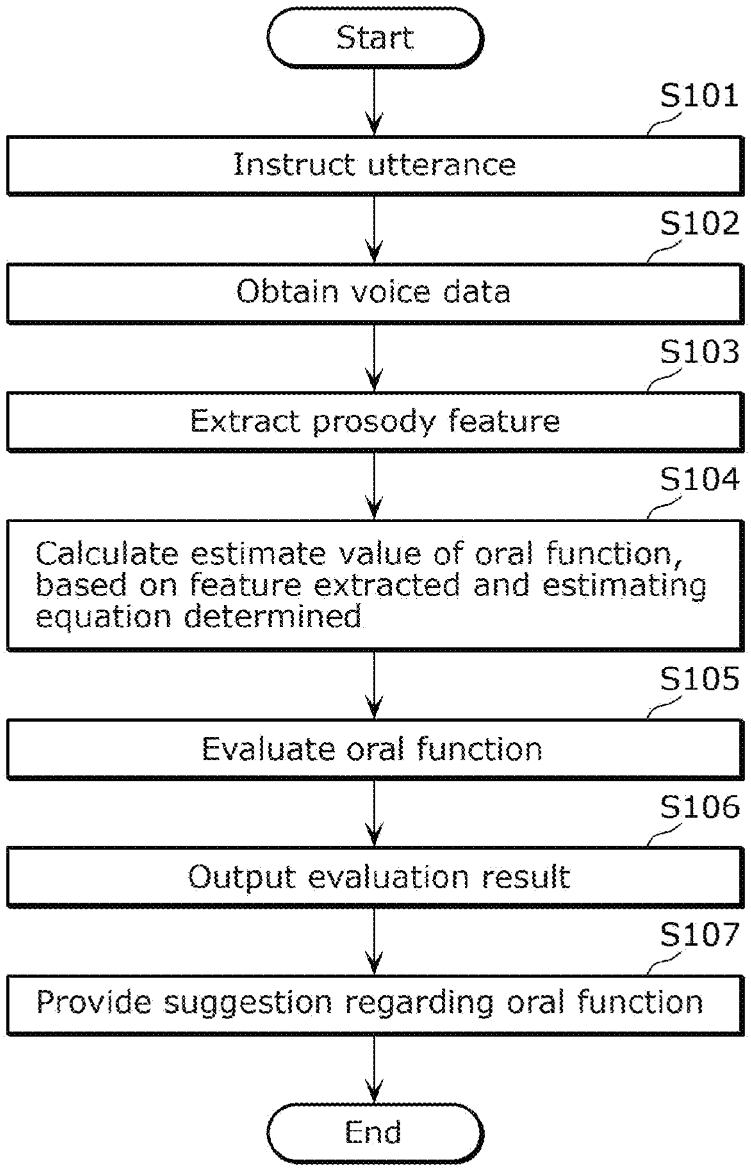
FIG. 3A is a flowchart illustrating a processing procedure for evaluating oral function of an evaluatee using an oral function evaluation method according to the embodiment.
Figure 4:
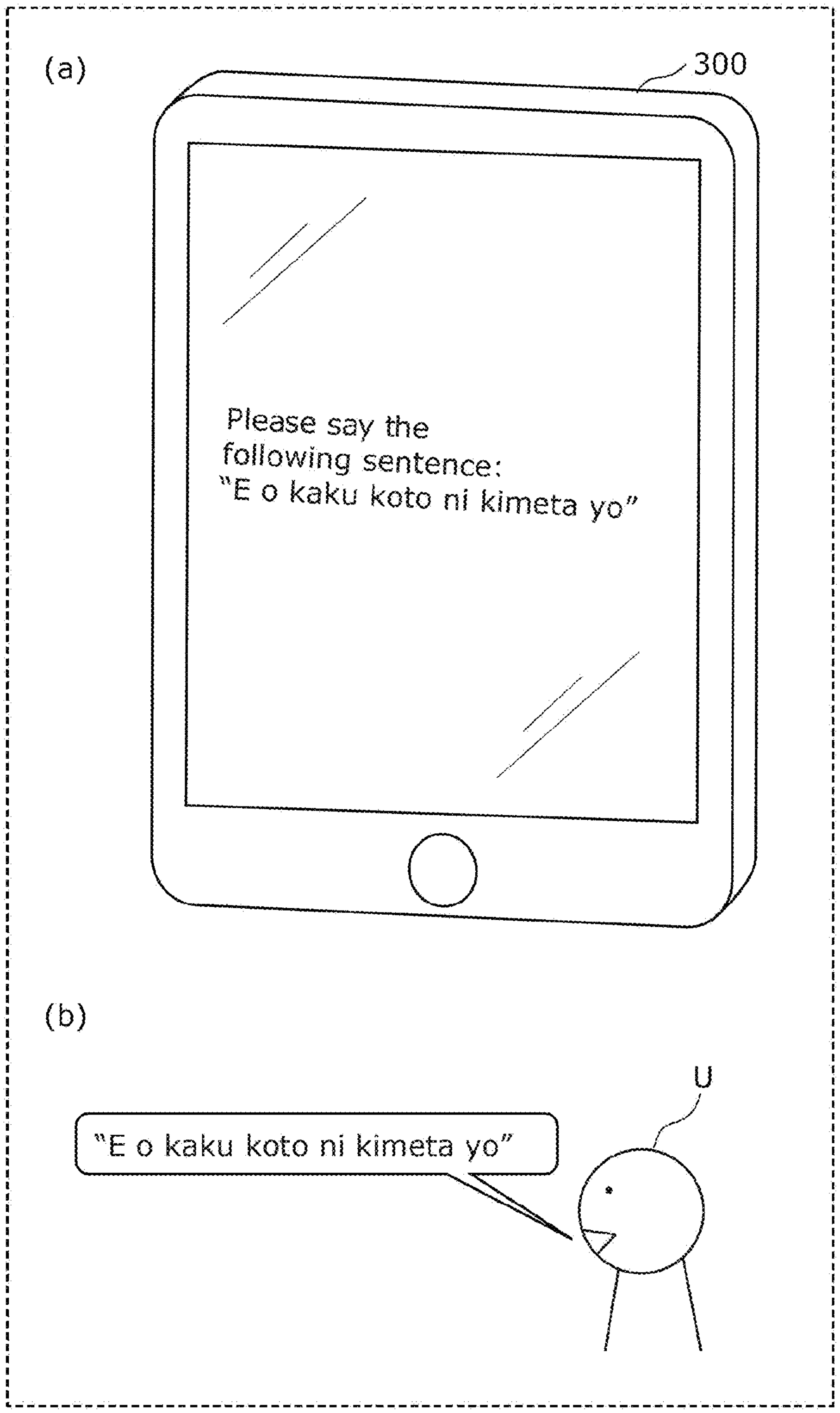
FIG. 4 is a diagram illustrating an outline of a method for obtaining a voice of an evaluatee using the oral function evaluation method according to the embodiment.

FIG. 3A is a flowchart illustrating a processing procedure for evaluating oral function of evaluatee U using the oral function evaluation method according to the embodiment. FIG. 4 is a diagram illustrating an outline of a method for obtaining a voice of evaluatee U using the oral function evaluation method.

First, the instructor instructs evaluatee U to utter a phrase or a fixed sentence that includes (i) two or more morae including a change in the first formant frequency or a change in the second formant frequency or (ii) at least one of a flap, a plosive, a voiceless sound, a double consonant, or a fricative (step S101). For example, in step S101, the instructor obtains image data on an instruction image stored in storage 170 and indicating an instruction to evaluatee U, and outputs the image data to mobile terminal 300. With this, as illustrated in (a) of FIG. 4, the instruction image indicating an instruction to evaluatee U is displayed on mobile terminal 300. It should be noted that although "E o kaku koto ni kimeta yo" is shown in (a) of FIG. 4 as an example of the fixed sentence, an instruction to utter a fixed sentence such as "Hana saka jiisan to saru kani kassen", "Hanabi no e o kaku", or "Himawari ga saita" may be provided. Alternatively, an instruction to utter a phrase such as "ippai," "ittai," "ikkai," "pattan," "kappa," "shippo," "kikkari," or "katteni" may be provided. Alternatively, an instruction to utter a phrase such as "kara," "sara," "chara," "jara," "shara," "kyara," or "*pura*" may be provided. Alternatively, an instruction to utter a phrase such as "aei," "iea," "ai," "ia," "kakeki," "kikeka," "naneni," "chiteta," "papepi," "pipepa," "katepi," "chipeka," "kaki," "tachi," "papi," "misa," "rari," "wani," "niwa," "eo," "io," "iu," "teko," "kiro," "teru", "peko," "memo," or "emo" may be provided. The instruction to utter a phrase may be an instruction to repeatedly utter such a phrase as described above.

The instructor may obtain voice data on an instruction voice that is stored in storage 170 and indicates an instruction to evaluatee U, and output the voice data to mobile terminal 300 so as to provide the above-described instruction using the instruction voice that instructs evaluatee U to utter a phrase or a fixed sentence, without using the instruction image that instructs evaluatee U to utter a phrase or a fixed sentence. Alternatively, an evaluating person (a family member, a doctor, etc.) who wishes to evaluate oral function of evaluatee U may provide the above-described instruction to evaluatee U using the voice of the evaluating person, without using the instruction image or the instruction voice that instructs evaluatee U to utter a phrase or a fixed sentence.

For example, the phrase or the fixed sentence uttered may include a combination of two or more vowels or a vowel and a consonant. Here, the combination of two or more vowels or a vowel and a consonant involves mouth opening and closing or back and forth tongue movement for utterance. "E o kaku koto ni kimeta yo" in Japanese is an example of such a phrase or fixed sentence. Uttering "e o" in "e o kaku koto ni kimeta yo" involves back and forth tongue movement, and uttering "kimeta" in "e o kaku koto ni kimeta yo" involves mouth opening and closing. The part "e o" in "e o kaku koto ni kimeta yo" includes second formant frequencies of the vowel "e" and the vowel "o," and includes an amount of change in the second formant frequency because the vowel "e" and the vowel "o" adjoin each other. This part also includes a change over time in the second formant frequency. The part "kimeta" in "e o kaku koto ni kimeta yo" includes first formant frequencies of the vowel "i," the vowel "e," and the vowel "a," and includes amounts of change in the first formant frequency because the vowel "i," the vowel "e," and the vowel "a" adjoin one another. This part also includes changes over time in the first formant frequency. Uttering "e o kaku koto ni kimeta yo" enables extraction of prosody features such as sound pressure differences, the first formant frequencies, the second formant frequencies, the amounts of change in the first formant frequency, the amounts of change in the second formant frequency, the changes over time in the first formant frequency, the changes over time in the second formant frequency, the speech rate, and the like.

For example, the fixed sentence uttered may include repetition of a phrase including a flap and a consonant different from the flap. "Karakarakara . . . " in Japanese is an example of such a fixed sentence. Repeatedly uttering "karakarakara . . . " enables extraction of prosody features such as sound pressure differences, changes over time in the sound pressure difference, changes over time in sound pressure, the number of repetitions, and the like.

For example, the phrase or the fixed sentence uttered may include at least one combination of a vowel and a plosive. "Ittai" in Japanese is an example of such a phrase. Uttering "ittai" enables extraction of prosody features such as sound pressure differences, a time length of a plosive (a time length between vowels), and the like.

Incidentally, the prosody feature of the sound pressure difference is easily affected by background noise, and thus, the prosody feature of the sound pressure difference may adversely affect the accuracy of the estimation of an estimate value especially in a sound collection environment with a relatively low S/N ratio. In view of the above, in the present invention, an estimating equation is determined according to the S/N ratio calculated by S/N ratio calculator 115 so that the influence that the feature of the sound pressure difference has on the calculation of an estimate value varies. By doing so, the present invention makes it possible to estimate an estimate value with reduced possibility of the prosody feature of the sound pressure difference adversely affecting the accuracy of the estimation of the estimate value.

Figure 3B:
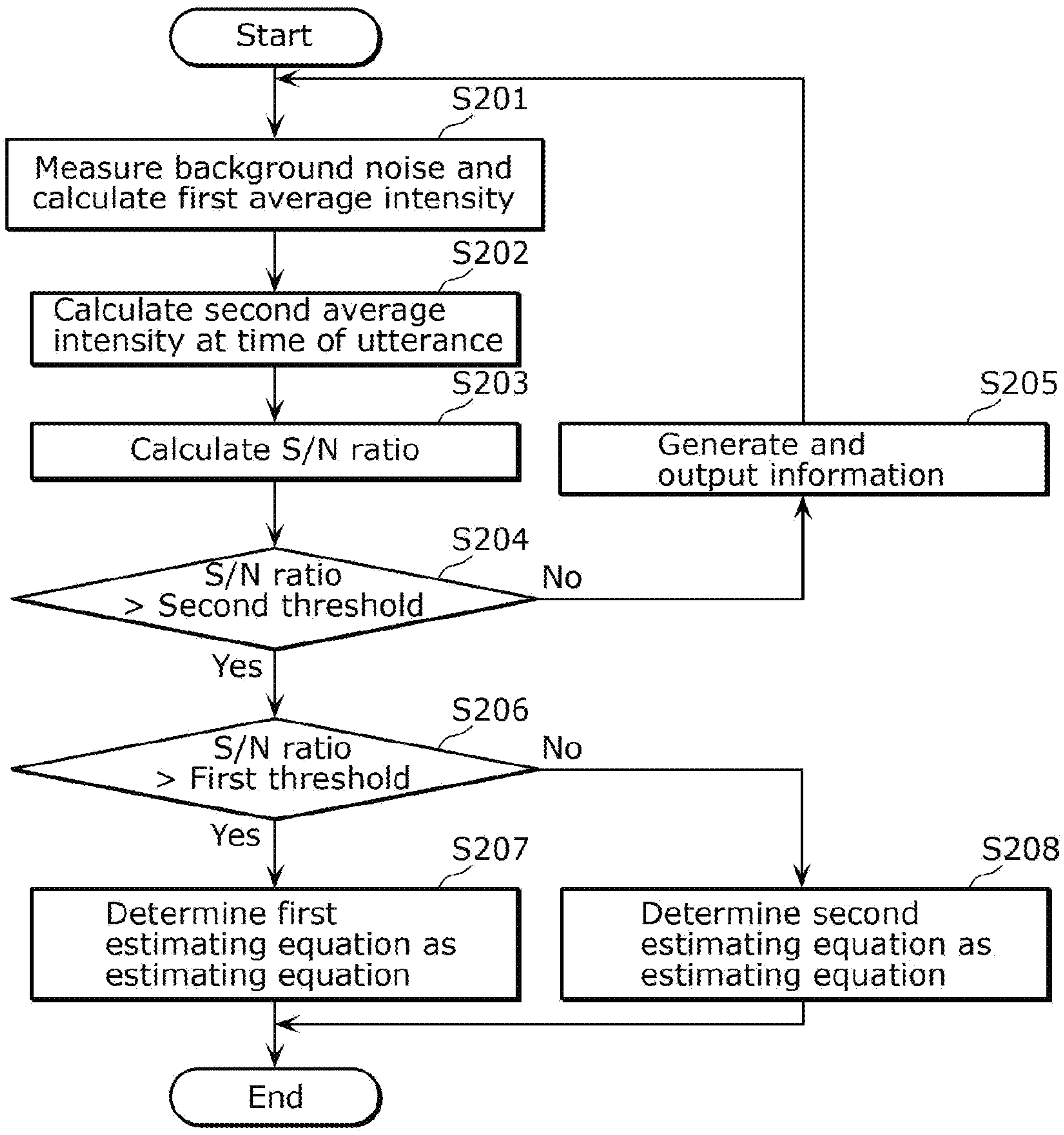
FIG. 3B is a flowchart illustrating a processing procedure for determining an estimating equation in the oral function evaluation method according to the embodiment.
Figure 3C:
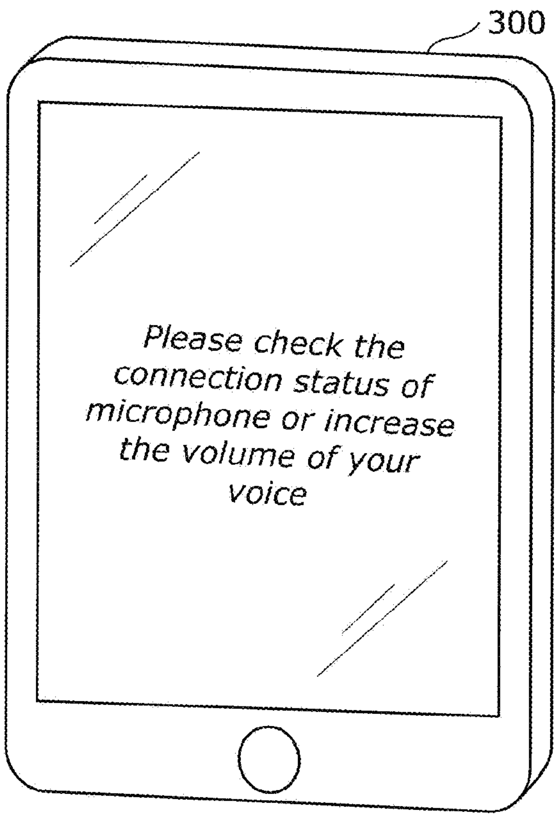
FIG. 3C is a diagram illustrating an example of information output in the oral function evaluation method according to the embodiment.
Figure 3D:
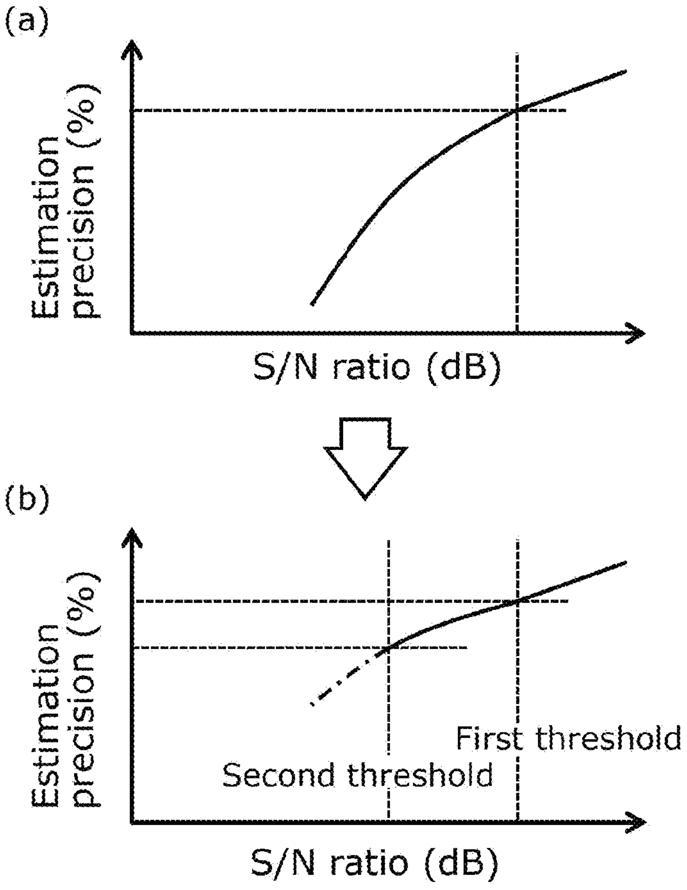
FIG. 3D shows graphs each illustrating a relationship between determination of an estimating equation in the oral function evaluation method according to the embodiment and accuracy (estimation precision).

Operation such as specific processing performed for this purpose will now be described with reference to FIG. 3B through FIG. 3D. FIG. 3B is a flowchart illustrating a processing procedure for determining an estimating equation in the oral function evaluation method according to the embodiment. FIG. 3C is a diagram illustrating an example of information output in the oral function evaluation method according to the embodiment. FIG. 3D shows graphs each illustrating a relationship between determination of an estimating equation in the oral function evaluation method according to the embodiment and accuracy (estimation precision).

As illustrated in FIG. 3B, in order to calculate the S/N ratio, S/N ratio calculator 115 measures background noise and calculates the first average intensity (sound pressure) of the background noise only (step S201). For the measurement of the background noise, it suffices so long as a sound collected in a period in which evaluatee U does not utter a voice is extracted and used. For example, as described above, when evaluatee U is uttering an instructed phrase or fixed sentence, a sound may be extracted in a background noise period before or after evaluatee U utters the phrase or the fixed sentence, or if the fixed sentence includes a pause, a sound may be extracted during the pause regarded as the background noise period.

Subsequently, in order to calculate the S/N ratio, S/N ratio calculator 115 calculates the second average intensity (sound pressure) at the time of the utterance of evaluatee U (step S202). Here, a sound included in the utterance of the instructed phrase or fixed sentence may be used, or evaluatee U may be instructed to separately utter an arbitrary phrase or fixed sentence for sound collection. Alternatively, if evaluatee U is in a situation of having a conversation with someone immediately before the evaluation of oral function, the first average intensity and the second average intensity may be calculated utilizing that situation.

S/N ratio calculator 115 subsequently calculates the S/N ratio by calculating the ratio of the second average intensity to the first average intensity (step S203). Here, the calculated S/N ratio is output to information outputter 180. Information outputter 180 then determines whether the S/N ratio is greater than a second threshold (step S204). When the S/N ratio is determined to be less than or equal to the second threshold (No in S204), information outputter 180 generates and outputs information for improving the sound collection environment so as to increase the S/N ratio (step S205).

For example, FIG. 3C illustrates, as an example of the case where such information is output, mobile terminal 300 displaying "Please check the connection status of microphone or increase the volume of your voice." By outputting the information in such a manner, an instruction is provided to increase the S/N ratio by at least one of:reducing the background noise, i.e., decreasing the first average intensity; or increasing the volume of the evaluatee's voice, i.e., increasing the second average intensity. It should be noted that mobile terminal 300 may display "Please change the location for sound collection" so as to reduce the environmental sound when the evaluatee utters a voice.

Returning to FIG. 3B, when the S/N ratio is determined to be greater than the second threshold (Yes in S204), information outputter 180 does nothing in particular and proceeds to step S206. Specifically, the calculated S/N ratio is also output to determiner 116. Determiner 116 determines whether the S/N ratio is greater than a first threshold (step S206). When the S/N ratio is determined to be less than or equal to the first threshold (No in S206), determiner 116 determines, as the estimating equation to be used for the estimation, a second estimating equation that does not include a feature related to sound pressure among prosody features extracted from the voice data (step S208), and stores the determined estimating equation in storage 170 as estimating equation data 171. On the other hand, when the S/N ratio is determined to be greater than the first threshold (Yes in S206), determiner 116 determines, as the estimating equation to be used for the estimation, a first estimating equation that includes a feature related to sound pressure among the prosody features extracted from the voice data (step S207) and stores the determined estimating equation in storage 170 as estimating equation data 171.

In such a manner, an estimating equation that includes a prosody feature related to sound pressure or an estimating equation that does not include a prosody feature related to sound pressure is determined according to the S/N ratio, and is used for the estimation of an estimate value. For example, in FIG. 3D, graph (a) illustrates the relationship between the S/N ratio and estimation precision when the same estimating equation is used for all cases without considering the S/N ratio, and graph (b) illustrates the relationship between the S/N ratio and estimation precision when an estimating equation that includes a prosody feature related to sound pressure or an estimating equation that does not include a prosody feature related to sound pressure is determined according to the S/N ratio.

As illustrated in FIG. 3D, when the S/N ratio is greater than the first threshold, the estimation precision is the same in both graphs (a) and (b). However, in the range in which the S/N ratio is less than or equal to the first threshold and greater than the second threshold, the estimation precision is lower in graph (a) of FIG. 3D than in graph (b) of FIG. 3D because a prosody feature related to sound pressure affected by the background noise reduces the estimation precision. When the S/N ratio is less than or equal to the second threshold, an instruction to increase the S/N ratio is provided. As a result, before the estimation of an estimate value takes place, the environment for the sound collection is changed to an environment with an improved S/N ratio, and processing is performed again from the obtaining of voice data. As a consequence, as shown by the dash-dot-dash line in graph (b) of FIG. 3D, an estimate value is less likely to be estimated with low estimation precision. However, even when the S/N ratio is less than or equal to the second threshold, the estimation precision is higher than that in graph (a) of FIG. 3D, so it is still useful to estimate an estimate value in this state. Returning to the description of FIG. 3A, the voice data may be obtained by collecting a voice of evaluatee U uttering a phrase or a fixed sentence at least twice at different speech rates. For example, evaluatee U is instructed to utter "e o kaku koto ni kimeta yo" at his/her usual speed and at a faster speed. The maintenance level of the state of oral function can be estimated by evaluatee U uttering "e o kaku koto ni kimeta yo" at his/her usual speed and at a faster speed.

Next, as illustrated in FIG. 3A, obtainer 110 obtains, via mobile terminal 300, the voice data of evaluatee U instructed in step S101 (step S102). As illustrated in (b) of FIG. 4, in step S102, for example, evaluatee U utters a phrase or a fixed sentence such as "e o kaku koto ni kimeta yo" toward mobile terminal 300. Obtainer 110 obtains, as the voice data, the phrase or the fixed sentence uttered by evaluatee U.

Next, extractor 120 extracts a prosody feature from the voice data obtained by obtainer 110 (step S103).

For example, when the voice data obtained by obtainer 110 is voice data obtained from a voice of evaluatee U uttering "e o kaku koto ni kimeta yo," extractor 120 extracts, as the prosody features, sound pressure differences, the first formant frequencies, the second formant frequencies, the amounts of change in the first formant frequency, the amounts of change in the second formant frequency, the changes over time in the first formant frequency, the changes over time in the second formant frequency, and the speech rate. This will be described with reference to FIG. 5A and FIG. 5B.

Figure 5A:
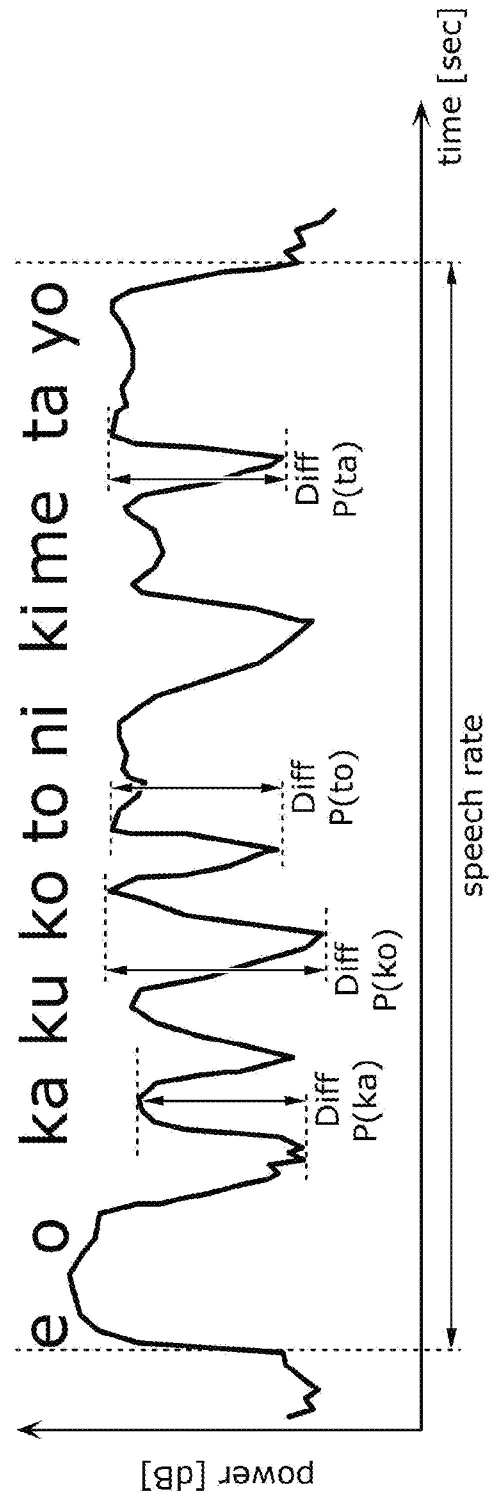
FIG. 5A is a graph illustrating an example of voice data indicating a voice of an evaluatee uttering "e o kaku koto ni kimeta yo."

FIG. 5A is a graph illustrating an example of voice data indicating a voice of evaluatee U uttering "e o kaku koto ni kimeta yo." In the graph illustrated in FIG. 5A, the horizontal axis indicates time, and the vertical axis indicates power (sound pressure). It should be noted that the power indicated on the vertical axis of the graph in FIG. 5A is expressed in decibels (dB).

In the graph illustrated in FIG. 5A, changes in sound pressure corresponding to "e," "o," "ka," "ku," "ko," "to," "ni," "ki," "me," "ta," "yo" are recognized. In step S102 shown in FIG. 3A, obtainer 110 obtains from evaluatee U the voice data illustrated in FIG. 5A. For example, extractor 120 extracts, in step S103 shown in FIG. 3A, sound pressures of "k" and "a" in "ka," sound pressures of "k" and "o" in "ko," sound pressures of "t" and "o" in "to," and sound pressures of "t" and "a" in "ta" included in the voice data illustrated in FIG. 5A, with a known method. From the sound pressures of "k" and "a" extracted, extractor 120 extracts sound pressure difference Diff_P(ka) between "k" and "a" as a prosody feature. Likewise, extractor 120 extracts sound pressure difference Diff_P(ko) between "k" and "o," sound pressure difference Diff_P(to) between "t" and "o," and sound pressure difference Diff_P(ta) between "t" and "a" as prosody features. For example, based on a sound pressure difference, oral function regarding swallowing force (pressure of the tongue in contact with the palate) or bolus formation ability can be evaluated. In addition, based on a sound pressure difference including "k," oral function regarding an ability to prevent food and drink from flowing into the throat can be evaluated.

Figure 5B:
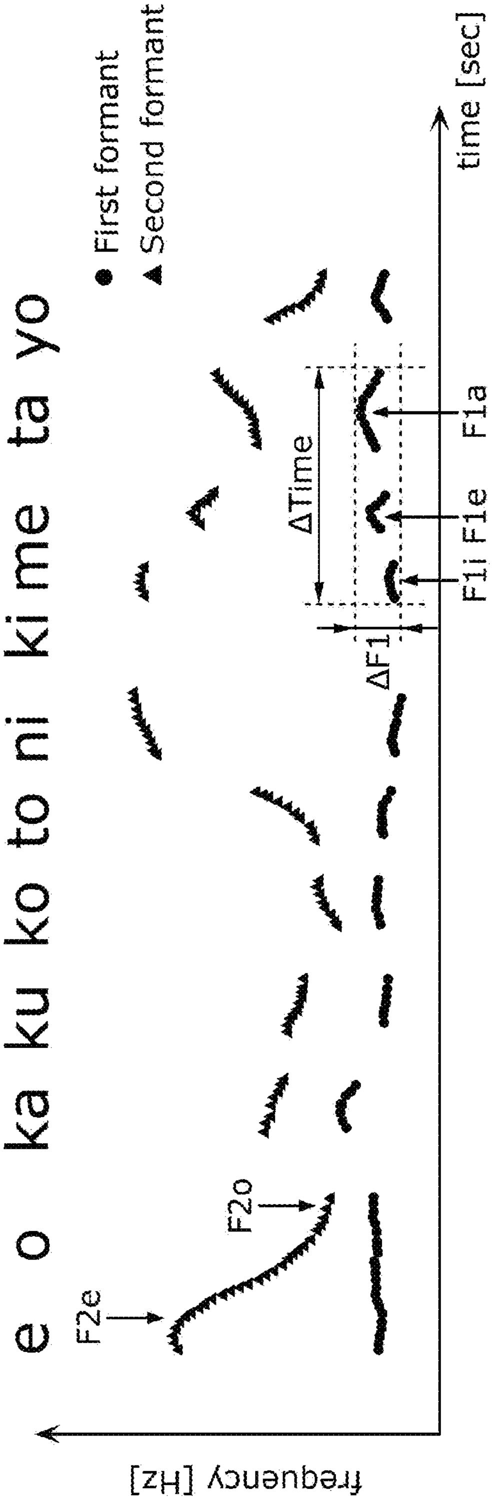
FIG. 5B is a graph illustrating an example of changes in formant frequencies of a voice of an evaluatee uttering "e o kaku koto ni kimeta yo.

FIG. 5B is a graph illustrating an example of changes in formant frequencies of a voice of evaluatee U uttering "e o kaku koto ni kimeta yo." Specifically, FIG. 5B is a graph for describing an example of changes in the first formant frequency and changes in the second formant frequency.

The first formant frequency is a peak frequency of the amplitude of a human voice that appears first from the low-frequency side. The first formant frequency is known for its tendency to reflect a feature regarding mouth opening and closing. The second formant frequency is a peak frequency of the amplitude of a human voice that appears second from the low-frequency side. The second formant frequency is known for its tendency to reflect an influence regarding back and forth tongue movement.

From the voice data indicating the voice uttered by evaluatee U, extractor 120 extracts a first formant frequency and a second formant frequency of each of the vowels, as prosody features. For example, extractor 120 extracts second formant frequency F2*e* corresponding to the vowel "e" and second formant frequency F2*o* corresponding to the vowel "o" in "e o," as the prosody features. In addition, for example, extractor 120 extracts first formant frequency F1*i* corresponding to the vowel "i," first formant frequency F1*e* corresponding to the vowel "e," and first formant frequency F1*a* corresponding to the vowel "a" in "kimeta," as the prosody features.

Extractor 120 further extracts amounts of change in the first formant frequency and amounts of change in the second formant frequency of a string of consecutive vowels, as prosody features. For example, extractor 120 extracts an amount of change between second formant frequency F2*e* and second formant frequency F2*o* (F2*e*−F20) and amounts of change between first formant frequency F1*i*, first formant frequency F1*e*, and first formant frequency F1*a* (F1*e*−F1*i*, F1*a*−F1*e*, and F1*a*−F1*i*), as the prosody features.

Extractor 120 further extracts changes over time in the first formant frequency and changes over time in the second formant frequency of a string of consecutive vowels, as prosody features. For example, extractor 120 extracts a change over time from second formant frequency F2*e* to second formant frequency F2*o* and a change over time from first formant frequency F1*i* through first formant frequency F1*e* to first formant frequency F1*a*, as the prosody features. FIG. 5B illustrates an example of the change over time from first formant frequency F1*i* through first formant frequency F1*e* to first formant frequency F1*a*, and the change over time is ΔF1/ΔTime. Here, ΔF1 is F1*a*−F1*i*.

For example, based on the second formant frequency, an amount of change in the second formant frequency, or a change over time in the second formant frequency, oral function regarding movement of gathering food (tongue movement in all directions) can be evaluated. In addition, for example, based on the first formant frequency, an amount of change in the first formant frequency, or a change over time in the first formant frequency, oral function regarding an ability to chew food can be evaluated. In addition, based on a change over time in the first formant frequency, oral function regarding an ability to move the mouth quickly can be evaluated.

Extractor 120 may extract the speech rate as a prosody feature as illustrated in FIG. 5A. For example, extractor 120 may extract, as a prosody feature, a time length from the start to the end of the utterance of "e o kaku koto ni kimeta yo" by evaluatee U. Also, for example, extractor 120 may extract, as a prosody feature, a time length from the start to the end of utterance of a given part of "e o kaku koto ni kimeta yo" rather than the time length taken to finish the utterance of the entire "e o kaku koto ni kimeta yo." Furthermore, for example, extractor 120 may extract, as a prosody feature, an average time length taken to utter the entire "e o kaku koto ni kimeta yo" or one or more words in a given part of "e o kaku koto ni kimeta yo." For example, based on the speech rate, oral function regarding movement of swallowing, movement of gathering food, or tongue dexterity can be evaluated.

For example, when the voice data obtained by obtainer 110 is voice data obtained from a voice of evaluatee U repeatedly uttering "karakarakara . . . ," extractor 120 extracts changes over time in sound pressure difference as a prosody feature. This will be described with reference to FIG. 6.

Figure 6:
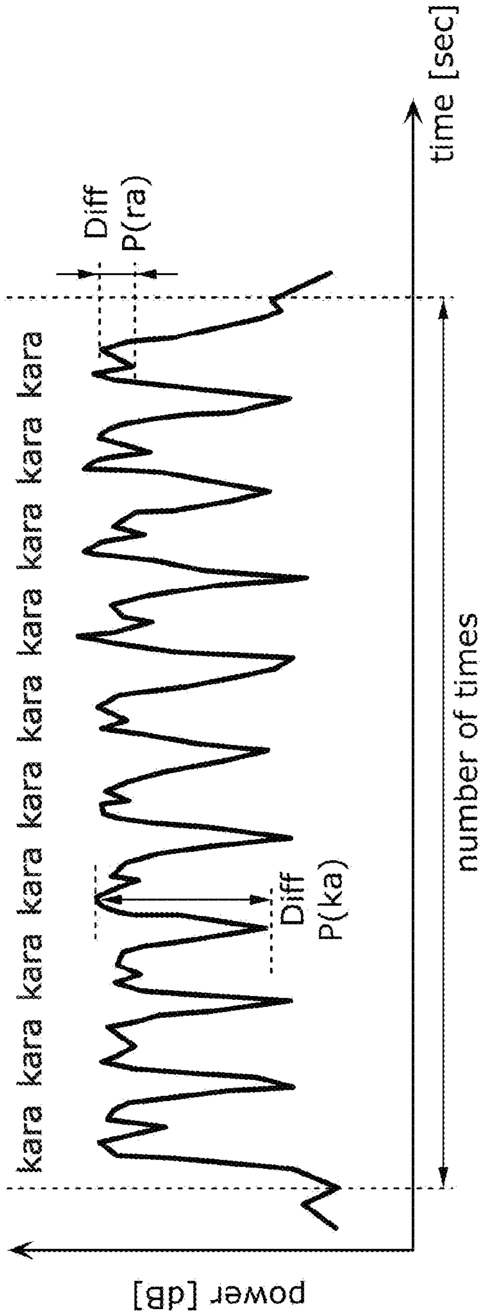
" [FIG. 6]

FIG. 6 is a graph illustrating an example of voice data indicating a voice of evaluatee U repeatedly uttering "karakarakara . . . ." In the graph illustrated in FIG. 6, the horizontal axis indicates time, and the vertical axis indicates power (sound pressure). It should be noted that the power indicated on the vertical axis of the graph in FIG. 6 is expressed in decibels (dB).

In the graph illustrated in FIG. 6, changes in sound pressure corresponding to "ka" and "ra" are recognized. In step S102 shown in FIG. 3A, obtainer 110 obtains from evaluatee U the voice data illustrated in FIG. 6. For example, extractor 120 extracts, in step S103 shown in FIG. 3A, sound pressures of "k" and "a" in "ka" and sound pressures of "r" and "a" in "ra" included in the voice data illustrated in FIG. 6, with a known method. From the sound pressures of "k" and "a" extracted, extractor 120 extracts sound pressure difference Diff_P(ka) between "k" and "a" as a prosody feature. Likewise, extractor 120 extracts sound pressure difference Diff_P(ra) between "r" and "a" as a prosody feature. For example, extractor 120 extracts sound pressure difference Diff_P(ka) and sound pressure difference Diff_P (ra) as prosody features from each of repeatedly uttered "kara." Extractor 120 subsequently extracts a change over time in sound pressure difference Diff_P(ka) as a prosody feature from each of sound pressure differences Diff_P(ka) extracted and extracts a change over time in sound pressure difference Diff_P(ra) as a prosody feature from each of sound pressure differences Diff_P(ra) extracted. For example, based on the changes over time in the sound pressure difference, oral function regarding movement of swallowing, movement of gathering food, or an ability to chew food can be evaluated.

It should be noted that extractor 120 may extract a change over time in sound pressure as a prosody feature. For example, in each of "kara" repeated in the utterance of "karakarakara . . . ," a change over time in minimum sound pressure (sound pressure of "k") may be extracted, a change over time in maximum sound pressure (sound pressure of "a") may be extracted, or a change over time in sound pressure between "ka" and "ra" (sound pressure of "r") may be extracted. For example, based on the changes over time in sound pressure, oral function regarding movement of swallowing, movement of gathering food, or an ability to chew food can be evaluated.

As illustrated in FIG. 6, extractor 120 may also extract, as a feature, the number of repetitions that is the number of times evaluatee U was able to utter "kara" per given time period. The given time period is not limited to a particular time period. For example, the given time period is five seconds. For example, based on the number of repetitions per given time period, oral function regarding movement of swallowing or movement of gathering food can be evaluated.

For example, when the voice data obtained by obtainer 110 is voice data obtained from a voice of evaluatee U uttering "ittai," extractor 120 extracts a sound pressure difference and a time length of a plosive as prosody features. This will be described with reference to FIG. 7.

Figure 7:
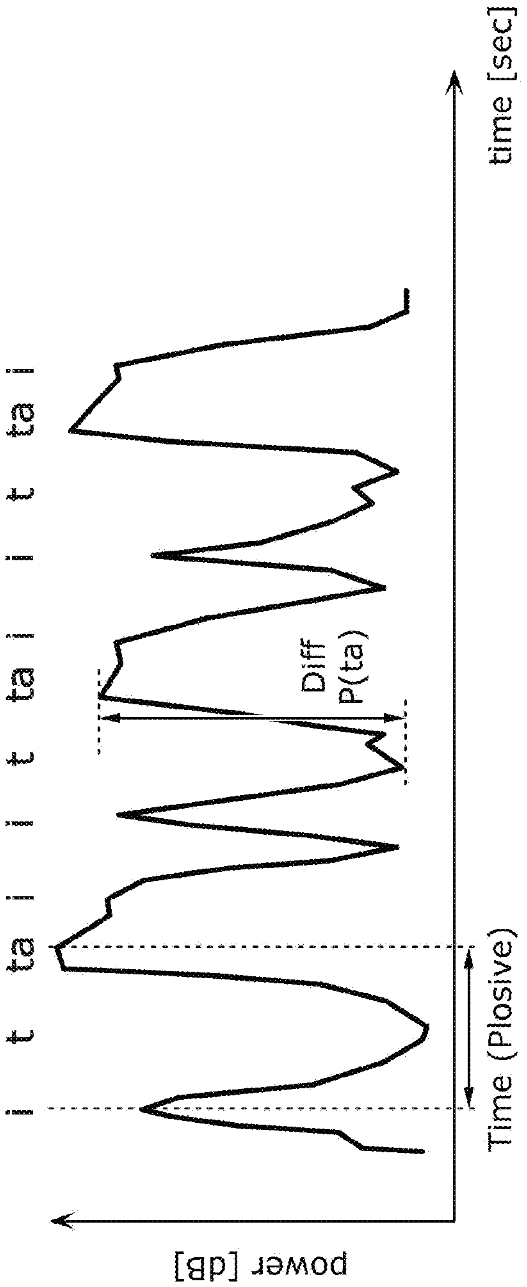
FIG. 7 is a graph illustrating an example of voice data indicating a voice of an evaluatee uttering "ittai."

FIG. 7 is a graph illustrating an example of voice data indicating a voice of evaluatee U uttering "ittai." Here, an example of voice data indicating a voice of evaluatee U repeatedly uttering "ittaiittai . . . " is illustrated. In the graph illustrated in FIG. 7, the horizontal axis indicates time, and the vertical axis indicates power (sound pressure). It should be noted that the power indicated on the vertical axis of the graph in FIG. 7 is expressed in decibels (dB).

In the graph illustrated in FIG. 7, changes in sound pressure corresponding to "i," "t," "ta," and "i" are recognized. In step S102 shown in FIG. 3A, obtainer 110 obtains from evaluatee U the voice data illustrated in FIG. 7. For example, extractor 120 extracts, in step S103 shown in FIG. 3A, sound pressures of "t" and "a" in "ta" included in the voice data illustrated in FIG. 7, with a known method. From the sound pressures of "t" and "a" extracted, extractor 120 extracts sound pressure difference Diff_P(ta) between "t" and "a" as a prosody feature. For example, based on the sound pressure difference, oral function regarding swallowing force or bolus formation ability can be evaluated. Extractor 120 also extracts a time length of a plosive Time (i–ta) (a time length of a plosive between "i" and "ta") as a prosody feature. For example, based on the time length of a plosive, oral function regarding movement of swallowing, movement of gathering food, or stable tongue movement can be evaluated.

It should be noted that although Japanese phrases and fixed sentences have been given as examples of the phrase or fixed sentence to be uttered, the phrase or fixed sentence to be uttered is not limited to Japanese and may be in any language. FIG. 8 is a table showing an example of phrases and fixed sentences in Japanese and phrases and fixed sentences in Chinese that are similar in tongue movement or degree of mouth opening and closing when pronounced.

There are various languages in the world, and there are pronunciations that are similar in tongue movement or degree of mouth opening and closing across different languages. For example, a Chinese sentence 高岛屋打卡即刻打一五折 (hereinafter written as gao dao wu da ka ji ke da yi wu zhe) is similar to a Japanese sentence "e o kaku koto ni kimeta yo" in tongue movement or degree of mouth opening and closing when pronounced and thus enables extraction of prosody features similar to prosody features of the Japanese sentence "e o kaku koto ni kimeta yo." It should be noted that tonal markers are omitted in the present specification. FIG. 8 shows, for reference, some examples of pairs of phrases or fixed sentences in Japanese and Chinese that are similar in tongue movement or degree of mouth opening and closing when pronounced.

Figure 9A:
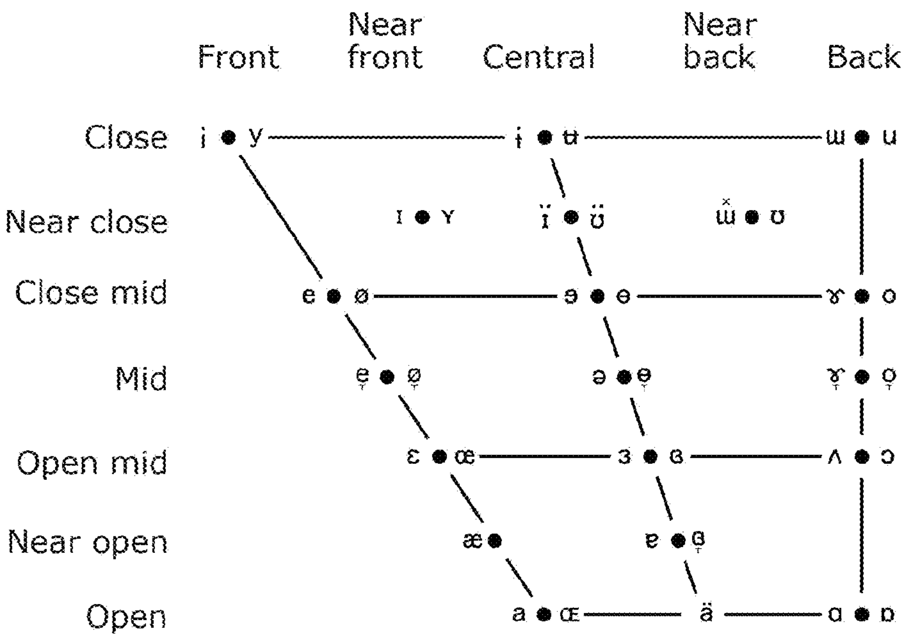
FIG. 9A is a diagram illustrating international phonetic alphabet symbols of vowels.

With reference to FIG. 9A and FIG. 9B, the following briefly describes the fact that there are pronunciations similar in tongue movement or degree of mouth opening and closing across different languages among various languages spoken in the world.

FIG. 9A is a diagram illustrating international phonetic alphabet symbols of vowels.

FIG. 9B is a table illustrating international phonetic alphabet symbols of consonants.

In a position relationship of the international phonetic alphabet symbols of vowels illustrated in FIG. 9A, the horizontal direction indicates back and forth tongue movement where symbols close to each other are similar in back and forth tongue movement, and the vertical direction indicates a degree of mouth opening and closing where symbols close to each other are similar in degree of mouth opening and closing. In the table of international phonetic alphabet symbols of consonants illustrated in FIG. 9B, the horizontal direction indicates parts from the lips to the throat used in pronunciation, and the same sound can be pronounced using the same part based on international phonetic alphabet symbols present in the same cell of the table. For this reason, the present invention is applicable to various languages spoken in the world.

For example, when a large mouth opening and closing is intended, a phrase or a fixed sentence is set to include consecutive international phonetic alphabet symbols that are away from each other in the vertical direction illustrated in FIG. 9A (e.g., "i" and "a"). Accordingly, an amount of change in the first formant frequency can be increased as a prosody feature. For example, when large back and forth tongue movement is intended, a phrase or a fixed sentence is set to include consecutive international phonetic alphabet symbols that are away from each other in the horizontal direction illustrated in FIG. 9A (e.g., "i" and "u"). Accordingly, an amount of change in the second formant frequency can be increased as a prosody feature.

For example, when the voice data obtained by obtainer 110 is voice data obtained from a voice of evaluatee U uttering "gao dao wu da ka ji ke da yi wu zhe," extractor 120 extracts, as prosody features, sound pressure differences, the first formant frequencies, the second formant frequencies, the amounts of change in the first formant frequency, the amounts of change in the second formant frequency, the changes over time in the first formant frequency, the changes over time in the second formant frequency, and the speech rate. This will be described with reference to FIG. 10A and FIG. 10B.

Figure 10A:
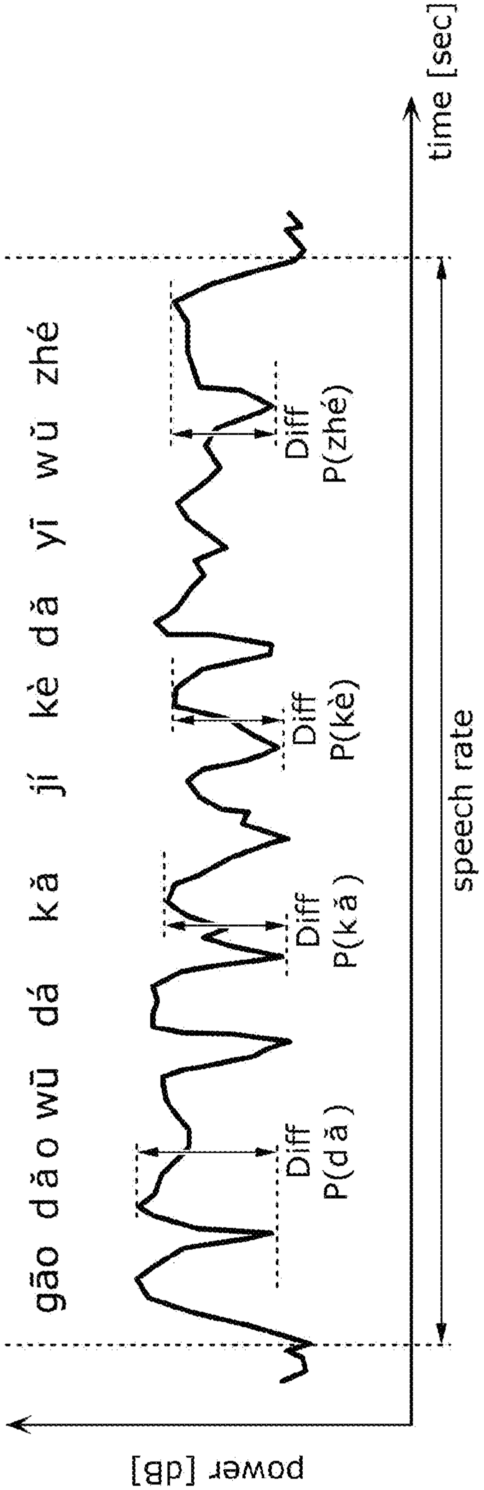
FIG. 10A is a graph illustrating an example of voice data indicating a voice of an evaluatee uttering "gao dao wu da ka ji ke da yi wu zhe."

FIG. 10A is a graph illustrating an example of voice data indicating a voice of evaluatee U uttering "gao dao wu da ka ji ke da yi wu zhe." In the graph illustrated in FIG. 10A, the horizontal axis indicates time, and the vertical axis indicates power (sound pressure). It should be noted that the power indicated on the vertical axis of the graph in FIG. 10A is expressed in decibels (dB).

In the graph illustrated in FIG. 10A, changes in sound pressure corresponding to "gao," "dao," "wu," "da," "ka," "ji," "ke," "da," "yi," "wu," and "zhe" are recognized. In step S102 shown in FIG. 3A, obtainer 110 obtains from evaluatee U the voice data illustrated in FIG. 10A. For example, extractor 120 extracts, in step S103 shown in FIG. 3A, sound pressures of "d" and "a" in "dao," sound pressures of "k" and "a" in "ka," sound pressures of "k" and "e" in "ke," and sound pressures of "zh" and "e" in "zhe" included in the voice data illustrated in FIG. 10A, with a known method. From the sound pressures of "d" and "a" extracted, extractor 120 extracts sound pressure difference Diff_P(da) between "d" and "a" as a prosody feature. Likewise, extractor 120 extracts, as prosody features, sound pressure difference Diff_P(ka) between "k" and "a," sound pressure difference Diff_P(ke) between "k" and "e," and sound pressure difference Diff_P(zhe) between "zh" and "e." For example, based on the sound pressure difference, oral function regarding swallowing force or bolus formation ability can be evaluated. In addition, based on the sound pressure difference including "k," oral function regarding an ability to prevent food and drink from flowing into the throat can be evaluated.

Figure 10B:
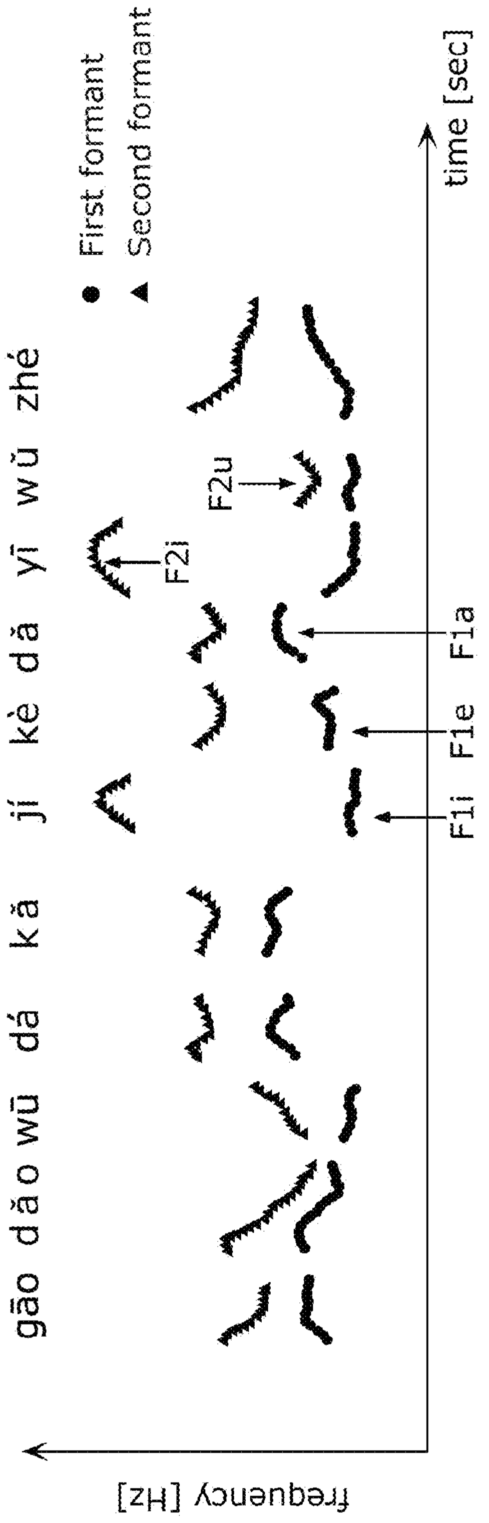
FIG. 10B is a graph illustrating an example of changes in formant frequencies of a voice of an evaluatee uttering "gao dao wu da ka ji ke da yi wu zhe."

FIG. 10B is a graph illustrating an example of changes in formant frequencies of a voice of evaluatee U uttering "gao dao wu da ka ji ke da yi wu zhe." Specifically, FIG. 10B is a graph for describing an example of changes in the first formant frequency and changes in the second formant frequency.

From the voice data indicating the voice uttered by evaluatee U, extractor 120 extracts the first formant frequency and the second formant frequency of each vowel, as prosody features. For example, extractor 120 extracts first formant frequency F1*i* corresponding to the vowel "i" in "ji," first formant frequency F1*e* corresponding to the vowel "e" in "ke," and first formant frequency F1*a* corresponding to the vowel "a" in "da," as prosody features. In addition, for example, extractor 120 extracts second formant frequency F2*i* corresponding to the vowel "i" in "yi," and second formant frequency F2*u* corresponding to the vowel "u" in "wu," as prosody features.

Extractor 120 further extracts amounts of change in the first formant frequency and amounts of change in the second formant frequency of a string of consecutive vowels, as prosody features. For example, extractor 120 extracts amounts of change between first formant frequency F1*i*, first formant frequency F1*e*, and first formant frequency F1*a* (F1*e*−F1*i*, F1*a*−F1*e*, and F1*a*−F1*i*) and an amount of change between second formant frequency F2*i* and second formant frequency F2*u* (F2*i*−F2*u*), as prosody features.

Extractor 120 further extracts changes over time in the first formant frequency and changes over time in the second formant frequency of a string of consecutive vowels, as prosody features. For example, extractor 120 extracts a change over time from first formant frequency F1*i* through first formant frequency F1*e* to first formant frequency F1*a* and a change over time from second formant frequency F2*i* to second formant frequency F2*u*, as prosody features.

For example, based on the second formant frequency, an amount of change in the second formant frequency, or a change over time in the second formant frequency, oral function regarding movement of gathering food can be evaluated. In addition, for example, based on the first formant frequency, an amount of change in the first formant frequency, or a change over time in the first formant frequency, oral function regarding an ability to chew food can be evaluated. In addition, based on a change over time in the first formant frequency, oral function regarding an ability to move the mouth quickly can be evaluated.

Extractor 120 may also extract the speech rate as a prosody feature as illustrated in FIG. 10A. For example, extractor 120 may extract, as a prosody feature, a time length from the start to the end of the utterance of "gao dao wu da ka ji ke da yi wu zhe" by evaluatee U. Also, for example, extractor 120 may extract, as a prosody feature, a time length from the start to the end of utterance of a given part of "gao dao wu da ka ji ke da yi wu zhe" rather than the time length taken to finish the utterance of the entire "gao dao wu da ka ji ke da yi wu zhe." Furthermore, for example, extractor 120 may extract, as a prosody feature, an average time length taken to utter the entire "gao dao wu da ka ji ke da yi wu zhe" or one or more words in a given part of "gao dao wu da ka ji ke da yi wu zhe." For example, based on the speech rate, oral function regarding movement of swallowing, movement of gathering food, or tongue dexterity can be evaluated.

Returning to the description of FIG. 3A, calculator 130 calculates an estimate value of oral function of evaluatee U, based on the prosody feature extracted and an oral function estimating equation calculated based on a plurality of training data items (step S104).

As described above, determiner 116 determines one oral function estimating equation from among a plurality of candidate estimating equations, based on the S/N ratio. Each of the plurality of candidate estimating equations is set in advance based on the results of evaluation performed on a plurality of subjects. Through a statistical analysis of voice features collected from utterances of the subjects and results of actual diagnoses on oral function of the subjects, each candidate estimating equation is set in the form of a multiple regression equation or the like about correlations between the voice features and the results of the diagnoses. Depending on a voice feature selected to be used as a representative value, different types of estimating equations can be generated. Candidate estimating equations can be generated in advance in this manner. Since the suitable estimating equation is normally different for each element of oral function, a plurality of candidate estimating equations are set for each element of oral function. In particular, in the present invention, a first estimating equation and a second estimating equation are set for each element of oral function.

Alternatively, candidate estimating equations may be set using machine learning to express correlations between the voice features and the results of the diagnoses. Techniques of the machine learning include logistic regression, support vector machine (SVM), and random forest.

For example, a candidate estimating equation can include a coefficient corresponding to an element of oral function and a variable that is substituted by a prosody feature extracted and is multiplied by the coefficient. Equations 1 through 5 shown below are examples of the first estimating equation.

$$\text{Estimate value of oral hygiene} = (A1\times F2e)+(B1\times F2o)+(C1\times F1i)+(D1\times F1e)+(E1\times F1a)+(F1\times \text{Diff\_P}(ka))+(G1\times \text{Diff\_P}(ko))+(H1\times \text{Diff\_P}(to))+(J1\times \text{Diff\_P}(ta))+(K1\times \text{Diff\_P}(ka))+(L1\times \text{Diff\_P}(ra))+(M1\times Num(kara))+(N1\times \text{Diff\_P}(ta))+(P1\times \text{Time}(i-ta))+Q1 \quad \text{(Equation 1)}$$

$$\text{Estimate value of oral dryness} = (A2\times F2e)+(B2\times F2o)+(C2\times F1i)+(D2\times F1e)+(E2\times F1a)+(F2\times \text{Diff\_P}(ka))+(G2\times \text{Diff\_P}(ko))+(H2\times \text{Diff\_P}(to))+(J2\times \text{Diff\_P}(ta))+(K2\times \text{Diff\_P}(ka))+(L2\times \text{Diff\_P}(ra))+(M2\times Num(kara))+(N2\times \text{Diff\_P}(ta))+(P2\times \text{Time}(i-ta))+Q2 \quad \text{(Equation 2)}$$

$$\text{Estimate value of occlusal force} = (A3\times F2e)+(B3\times F2o)+(C3\times F1i)+(D3\times F1e)+(E3\times F1a)+(F3\times \text{Diff\_P}(ka))+(G3\times \text{Diff\_P}(ko))+(H3\times \text{Diff\_P}(to))+(J3\times \text{Diff\_P}(ta))+(K3\times \text{Diff\_P}(ka))+(L3\times \text{Diff\_P}(ra))+(M3\times Num(kara))+(N3\times \text{Diff\_P}(ta))+(P3\times \text{Time}(i-ta))+Q3 \quad \text{(Equation 3)}$$

$$\text{Estimate value of tongue pressure} = (A4\times F2e)+(B4\times F2o)+(C4\times F1i)+(D4\times F1e)+(E4\times F1a)+(F4\times \text{Diff\_P}(ka))+(G4\times \text{Diff\_P}(ko))+(H4\times \text{Diff\_P}(to))+(J4\times \text{Diff\_P}(ta))+(K4\times \text{Diff\_P}(ka))+(L4\times \text{Diff\_P}(ra))+(M4\times Num(kara))+(N4\times \text{Diff\_P}(ta))+(P4\times \text{Time}(i-ta))+Q4 \quad \text{(Equation 4)}$$

$$\text{Estimate value of mastication function} = (A5\times F2e)+(B5\times F2o)+(C5\times F1i)+(D5\times F1e)+(E5\times F1a)+(F5\times \text{Diff\_P}(ka))+(G5\times \text{Diff\_P}(ko))+(H5\times \text{Diff\_P}(to))+(J5\times \text{Diff\_P}(ta))+(K5\times \text{Diff\_P}(ka))+(L5\times \text{Diff\_P}(ra))+(M5\times Num(kara))+(N5\times \text{Diff\_P}(ta))+(P5\times \text{Time}(i-ta))+Q5 \quad \text{(Equation 5)}$$

A1, B1, C1, . . . , P1, A2, B2, C2, . . . , P2, A3, B3, C3, . . . , P3, A4, B4, C4, . . . , P4, A5, B5, C5, . . . , P5 are coefficients, and are specifically coefficients corresponding to elements of oral function. For example, A1, B1, C1, . . . , P1 are coefficients corresponding to oral hygiene which is one of the elements of oral function; A2, B2, C2, . . . , P2 are coefficients corresponding to oral dryness which is one of the elements of oral function; A3, B3, C3, . . . , P3 are coefficients corresponding to occlusal force which is one of the elements of oral function; A4, B4, C4, . . . , P4 are coefficients corresponding to tongue pressure which is one of the elements of oral function; and A5, B5, C5, . . . , P5 are coefficients corresponding to mastication function which is one of the elements of oral function.

Q1 is a constant corresponding to oral hygiene, Q2 is a constant corresponding to oral dryness, Q3 is a constant corresponding to occlusal force, Q4 is a constant corresponding to tongue pressure, and Q5 is a constant corresponding to mastication function.

F2*e* multiplied by A1, A2, A3, A4, or A5 and F20 multiplied by B1, B2, B3, B4, or B5 are variables to be substituted by second formant frequencies that are prosody features extracted from utterance data on the utterance of "e o kaku koto ni kimeta yo" by evaluatee U. F1*i* multiplied by C1, C2, C3, C4, or C5, F1*e* multiplied by D1, D2, D3, D4, or D5, and F1*a* multiplied by E1, E2, E3, E4, or E5 are variables to be substituted by first formant frequencies that are prosody features extracted from utterance data on the utterance of "e o kaku koto ni kimeta yo" by evaluatee U. Diff_P(ka) multiplied by F1, F2, F3, F4, or F5, Diff_P(ko) multiplied by G1, G2, G3, G4, or G5, Diff_P(to) multiplied by H1, H2, H3, H4, or H5, and Diff_P(ta) multiplied by J1, J2, J3, J4, or J5 are variables to be substituted by sound pressure differences that are prosody features extracted from utterance data on the utterance of "e o kaku koto ni kimeta yo" by evaluatee U. Diff_P(ka) multiplied by K1, K2, K3, K4, or K5 and Diff_P(ra) multiplied by L1, L2, L3, L4, or L5 are variables to be substituted by sound pressure differences that are prosody features extracted from utterance data on the utterance of "kara" by evaluatee U. Num (kara) multiplied by M1, M2, M3, M4, or M5 is a variable to be substituted by the number of repetitions that is a prosody feature extracted from utterance data on the repeated utterance of "kara" by evaluatee U within a certain period. Diff_P(ta) multiplied by N1, N2, N3, N4, or N5 is a variable to be substituted by a sound pressure difference that is a prosody feature extracted from utterance data on the utterance of "ittai" by evaluatee U. Time (i–ta) multiplied by P1, P2, P3, P4, or P5 is a variable to be substituted by a time length of a plosive that is a prosody feature extracted from utterance data on the utterance of "ittai" by evaluatee U.

As shown in Equations 1 through 5 above, calculator 130, for example, calculates an estimate value for each of elements (e.g., tongue fur, oral dryness, occlusal force, tongue pressure, and mastication function) of oral function of evaluatee U. It should be noted that these elements of oral function are mere examples, and it suffices so long as the elements of oral function include at least one of tongue fur, oral dryness, occlusal force, tongue pressure, cheek pressure, the remaining number of teeth, swallowing function, or mastication function of evaluatee U.

In addition, for example, extractor 120 extracts a plurality of prosody features from voice data items obtained by collecting a voice of evaluatee U uttering two or more types of phrases or two or more types of fixed sentences (e.g., "e o kaku koto ni kimeta yo," "kara," and "ittai" in Equations 1 through 5 shown above), and calculator 130 calculates an estimate value of oral function based on the plurality of prosody features extracted and one of the estimating equations. By substituting the plurality of prosody features extracted from the voice data on the two or more types of phrases or two or more types of fixed sentences into one of the estimating equations, calculator 130 can calculate the estimate value of oral function with high precision.

Equations 6 through 10 shown below are examples of the second estimating equation.

$$\text{Estimate value of oral hygiene} = (A1 \times F2e) + (B1 \times F2o) + (C1 \times F1i) + (D1 \times F1e) + (E1 \times F1a) + (M1 \times Num(kara)) + (P1 \times \text{Time}(i - ta)) + Q1 \quad \text{(Equation 6)}$$

$$\text{Estimate value of oral dryness} = (A2 \times F2e) + (B2 \times F2o) + (C2 \times F1i) + (D2 \times F1e) + (E2 \times F1a) + (M2 \times Num(kara)) + (P2 \times \text{Time}(i - ta)) + Q2 \quad \text{(Equation 7)}$$

$$\text{Estimate value of occlusal force} = (A3 \times F2e) + (B3 \times F2o) + (C3 \times F1i) + (D3 \times F1e) + (E3 \times F1a) + (M3 \times Num(kara)) + (P3 \times \text{Time}(i - ta)) + Q3 \quad \text{(Equation 8)}$$

$$\text{Estimate value of tongue pressure} = (A4 \times F2e) + (B4 \times F2o) + (C4 \times F1i) + (D4 \times F1e) + (E4 \times F1a) + (M4 \times Num(kara)) + (P4 \times \text{Time}(i - ta)) + Q4 \quad \text{(Equation 9)}$$

$$\text{Estimate value of mastication function} = (A5 \times F2e) + (B5 \times F2o) + (C5 \times F1i) + (D5 \times F1e) + (E5 \times F1a) + (M5 \times Num(kara)) + (P5 \times \text{Time}(i - ta)) + Q5 \quad \text{(Equation 10)}$$

As shown from the above, as compared to the first estimating equation, the second estimating equation omits the terms of prosody features related to sound pressure such as a sound pressure difference, and thus enables estimation of appropriate estimate values with relatively high estimation precision even in a sound collection environment with a low S/N ratio.

It should be noted that, although the linear expressions are shown as the estimating equations, the estimating equations may be multidimensional equations such as two-dimensional equations.

Next, evaluator 140 evaluates a deterioration state of oral function of evaluatee U by assessing, using an oral function evaluation indicator, the estimate value calculated by calculator 130 (step S105). For example, evaluator 140 evaluates a deterioration state of oral function of evaluatee U for each of the elements of oral function by assessing, using an oral function evaluation indicator determined for each of the elements of oral function, the estimate value calculated for each of the elements of oral function. The oral function evaluation indicator is an indicator for evaluating oral function. For example, the oral function evaluation indicator is a condition for assessing that oral function has deteriorated. The oral function evaluation indicator will be described with reference to FIG. 11.

FIG. 11 is a diagram illustrating an example of oral function evaluation indicators.

An oral function evaluation indicator is determined for each of the elements of oral function. For example, an indicator 10 of 50% or more is determined for oral hygiene, an indicator of 27 or less is determined for oral dryness, an indicator of less than 200 N is determined for occlusal force (when DENTAL PRESCALE II from GC Corporation is used), an indicator of less than 30 kPa is determined for tongue pressure, and an indicator 15 of less than 100 mg/dL is determined for mastication function (for the indicators, see "Koukukinouteikashou ni kansuru kihonteki na kangaekata (in Japanese) (Basic approaches to oral hypofunction) in Japanese 20 Association for Dental Science). Evaluator 140 evaluates a deterioration state of oral function of evaluatee U for each of the elements of oral function by comparing the estimate value calculated for each of the elements of oral function with the oral function evaluation indicator determined for each of the 25 elements of oral function. For example, when the estimate value of oral hygiene calculated is 50% or more, oral hygiene as an element of oral function is evaluated as being in a deteriorated state. Likewise, when the estimate value of oral dryness calculated is 27 or less, oral dryness as an element of oral 30 function is evaluated as being in a deteriorated state; when the estimate value of occlusal force calculated is less than 200 N, occlusal force as an element of oral function is evaluated as being in a deteriorated state; when the estimate value of tongue pressure calculated is less than 30 kPa, tongue pressure as an 35 element of oral function is evaluated as being in a deteriorated state; and when the estimate value of mastication function calculated is less than 100 mg/dl, mastication function as an element of oral function is evaluated as being in a deteriorated state. It should be noted that those shown in FIG. 11 as the 5 oral function evaluation indicators determined for oral hygiene, oral dryness, occlusal force, tongue pressure, and mastication function are mere examples, and the oral function evaluation indicators are not limited to these. For example, an indicator for the remaining number of teeth may be determined for 10 mastication function. Furthermore, oral hygiene, oral dryness, occlusal force, tongue pressure, and mastication function are shown as elements of oral function, but are mere examples. For example, for tongue-lip motor hypofunction, elements such as tongue movement, lip movement, and lip strength are applicable 15 as elements of oral function.

Returning to the description of FIG. 3A, outputter 150 outputs an evaluation result on oral function of evaluatee U evaluated by evaluator 140 (step S106). For example, outputter 150 outputs the evaluation result to mobile terminal 300. In this case, for example, outputter 150 may include a communication interface that performs wired communication or wireless communication. Outputter 150 obtains from storage 170 image data on an image corresponding to the evaluation result and transmits the obtained image data to mobile terminal 300. An example of the image data (evaluation result) is illustrated in FIG. 12 and FIG. 13.

Figures 13, 14:
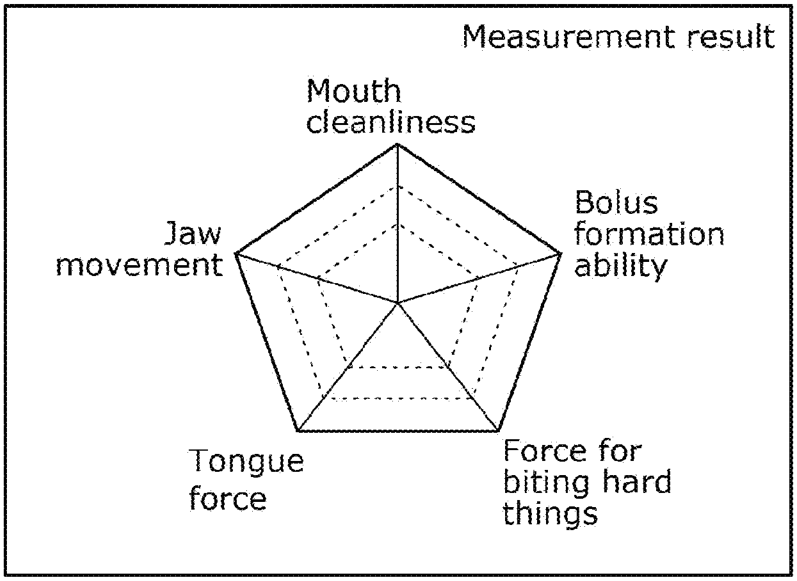
FIG. 13 is a chart illustrating an example of evaluation results on elements of oral function.
FIG. 14 is an example of predetermined data that is used when providing a suggestion regarding oral function.

FIG. 12 is a table and FIG. 13 is a chart each showing an example of the evaluation results on the elements of oral function. As shown in FIG. 12, each evaluation result may indicate one of two levels: OK or NG. OK means being normal, and NG means being abnormal. It should be noted that normal or abnormal need not be indicated for each element of oral function. For example, only an evaluation result of an element that is suspected of deteriorating may be indicated. Furthermore, the evaluation result is not limited to two levels, and may be in three or more fractionalized levels of evaluation. In this case, indicator data 172 stored in storage 170 may include a plurality of indicators for one element. Alternatively, as shown in FIG. 13, the evaluation result may be expressed in a radar chart. FIG. 12 and FIG. 13 show, as elements of oral function, mouth cleanliness, bolus formation ability, force for biting hard things, tongue force, and jaw movement. The evaluation result is presented based on the estimate value of oral hygiene for mouth cleanliness, the estimate value of oral dryness for bolus formation ability, the estimate value of occlusal force for force for biting hard things, the estimate value of tongue pressure for tongue force, and the estimate value of mastication function for jaw movement. It should be noted that FIG. 12 and FIG. 13 are mere examples, and that wording which describes the evaluation items, items of oral function, and combinations of such corresponding wording and items are not limited to those in FIG. 12 and FIG. 13.

Returning to the description of FIG. 3A, suggester 160 provides a suggestion regarding oral function of evaluatee U by checking the estimate value calculated by calculator 130 against predetermined data (suggestion data 173) (step S107). Here, the predetermined data will be described with reference to FIG. 14.

FIG. 14 is an example of predetermined data (suggestion data 173) that is used when providing a suggestion regarding oral function.

As shown in FIG. 14, suggestion data 173 is data in which an evaluation result and details of a suggestion are associated with each other for each of the elements of oral function. For example, when the estimate value of mouth cleanliness calculated is 50% or more, the indicator is satisfied. Therefore, suggester 160 determines mouth cleanliness as OK and provides a suggestion based on details of suggestion associated with mouth cleanliness. It should be noted that although descriptions of specific details of suggestions are omitted, storage 170 stores data indicating details of suggestions (e.g., image, video, voice, text, etc.), and suggester 160 provides a suggestion regarding oral function to evaluatee U using such data, for example.

Advantageous Effects Etc

As described above, the oral function evaluation method according to the present embodiment is an oral function evaluation method of evaluating a deterioration state of oral function of evaluatee U from a voice uttered by evaluatee U, the oral function evaluation method being a method to be performed by a terminal (mobile terminal 300) and oral function evaluation device 100 and including: obtaining voice data by the terminal collecting a voice uttered by evaluatee U; obtaining, by oral function evaluation device 100, the voice data; extracting, by oral function evaluation device 100, one or more features from the voice data obtained; calculating, by oral function evaluation device 100, using the voice data obtained, a first average intensity of a sound collected in a period in which evaluatee U does not utter a voice and a second average intensity of a sound collected in a period in which evaluatee U utters a voice, and calculating an S/N ratio that is a ratio of the second average intensity to the first average intensity; determining, by oral function evaluation device 100, an estimating equation to be used for evaluation of the oral function of evaluatee U; calculating, by oral function evaluation device 100, an estimate value of the oral function of evaluatee U, based on the estimating equation determined and the one or more features extracted; evaluating, by oral function evaluation device 100, the deterioration state of the oral function of evaluatee U by assessing the estimate value using an oral function evaluation indicator; and presenting, by the terminal, the deterioration state of the oral function of evaluatee U evaluated, wherein the determining of the estimating equation includes: determining a first estimating equation as the estimating equation when the S/N ratio calculated is greater than a first threshold, the first estimating equation being an estimating equation that includes a feature related to sound pressure among the one or more features extracted from the voice data; and determining a second estimating equation as the estimating equation when the S/N ratio calculated is less than or equal to the first threshold, the second estimating equation being an estimating equation that does not include the feature related to sound pressure.

Accordingly, it is possible to achieve the same advantageous effect as that of oral function evaluation device 100 which will be described later.

Furthermore, for example, as shown in FIG. 3A, the oral function evaluation method according to the present embodiment may include: obtaining voice data obtained by collecting a voice of evaluatee U uttering a phrase or a fixed sentence that includes (i) two or more morae including a change in a first formant frequency or a change in a second formant frequency or (ii) at least one of a flap, a plosive, a voiceless sound, a double consonant, or a fricative (step S102); extracting a prosody feature from the voice data obtained (step S103); calculating an estimate value of oral function of evaluatee U, based on the prosody feature extracted and an oral function estimating equation calculated based on a plurality of training data items (step S104); and evaluating a deterioration state of the oral function of evaluatee U by assessing the estimate value using an oral function evaluation indicator (step S105).

Accordingly, obtaining voice data suitable for evaluation of oral function makes it possible to evaluate oral function of evaluatee U in a simple and easy manner. In other words, simply by evaluatee U uttering the phrase or fixed sentence toward a sound collection device such as mobile terminal 300, it is possible to evaluate oral function of evaluatee U. In particular, since an estimate value of oral function is calculated using an estimating equation calculated based on a plurality of training data items, a deterioration state of oral function can be evaluated quantitatively. Furthermore, oral function is not evaluated by comparing a prosody feature directly with a threshold; rather, an estimate value is calculated from a prosody feature and an estimating equation, and the estimate value is compared with a threshold (oral function evaluation indicator). Therefore, a deterioration state of oral function can be evaluated with high precision.

For example, the estimating equation may include a coefficient corresponding to an element of oral function and a variable that is substituted by the prosody feature extracted and is multiplied by the coefficient.

Accordingly, an estimate value of oral function can be easily calculated, simply by substituting the extracted prosody feature into the estimating equation.

For example, in the calculating, the estimate value may be calculated for each of elements of oral function of evaluatee U, and in the evaluating, a deterioration state of oral function of evaluatee U may be evaluated for each of the elements of oral function by assessing, using an oral function evaluation indicator determined for each of the elements of oral function, the estimate value calculated for each of the elements of oral function.

Accordingly, the deterioration state of oral function can be evaluated for each element. For example, by preparing, for the respective elements of oral function, estimating equations including coefficients that differ according to the elements of oral function, it is possible to easily evaluate the deterioration state of oral function for each element.

For example, the elements of oral function may include at least one of tongue fur, oral dryness, occlusal force, tongue pressure, cheek pressure, the remaining number of teeth, swallowing function, or mastication function of evaluatee U.

Accordingly, it is possible to evaluate a deterioration state regarding at least one of the following elements of oral function of evaluatee U: tongue fur, oral dryness, occlusal force, tongue pressure, cheek pressure, the remaining number of teeth, swallowing function, or mastication function.

For example, the prosody feature may include at least one of a speech rate, a sound pressure difference, a change over time in the sound pressure difference, the first formant frequency, the second formant frequency, an amount of change in the first formant frequency, an amount of change in the second formant frequency, a change over time in the first formant frequency, a change over time in the second formant frequency, or a time length of a plosive.

Deterioration in oral function causes a change in pronunciation. Therefore, the deterioration state of oral function can be evaluated from these prosody features.

For example, in the extracting, a plurality of prosody features may be extracted from voice data obtained by collecting a voice of evaluatee U uttering two or more types of phrases or two or more types of fixed sentences, and in the calculating, an estimate value may be calculated based on the plurality of prosody features extracted and the estimating equation.

Accordingly, by using, for one estimating equation, the plurality of prosody features extracted based on two or more types of phrases or two or more types of fixed sentences, the precision of the calculation of an estimate value of oral function can be increased.

For example, the phrase or the fixed sentence may include a combination of two or more vowels or a vowel and a consonant. Here, the combination involves mouth opening and closing or back and forth tongue movement for utterance.

Accordingly, a prosody feature including an amount of change in the first formant frequency, a change over time in the first formant frequency, an amount of change in the second formant frequency, or a change over time in the second formant frequency can be extracted from a voice of evaluatee U uttering such a phrase or fixed sentence.

For example, the voice data may be obtained by collecting a voice of evaluatee U uttering a phrase or a fixed sentence at least twice at different speech rates.

Accordingly, the maintenance level of the state of oral function can be estimated from a voice of evaluatee U uttering such a phrase or fixed sentence.

For example, the fixed sentence may include repetition of a phrase including a flap and a consonant different from the flap.

Accordingly, prosody features including a change over time in sound pressure difference, a change over time in sound pressure, and the number of repetitions can be extracted from a voice of evaluatee U uttering such a phrase or fixed sentence.

For example, the phrase or the fixed sentence may include at least one combination of a vowel and a plosive.

Accordingly, prosody features including a sound pressure difference and a time length of a plosive can be extracted from a voice of evaluatee U uttering such a phrase or fixed sentence.

For example, the oral function evaluation method may further include providing a suggestion regarding oral function of evaluatee U by checking the estimate value against predetermined data.

Accordingly, evaluatee U can receive a suggestion on what measures should be taken when the oral function deteriorates.

Oral function evaluation device 100 according to the present embodiment is oral function evaluation device 100 that evaluates a deterioration state of oral function of evaluatee U from a voice uttered by evaluatee U, the oral function evaluation device including: obtainer 110 that obtains voice data obtained by collecting a voice uttered by evaluatee U; extractor 120 that extracts one or more features from the voice data obtained; S/N ratio calculator 115 that, using the voice data obtained, calculates a first average intensity of a sound collected in a period in which evaluatee U does not utter a voice and a second average intensity of a sound collected in a period in which evaluatee U utters a voice, and calculates a signal-to-noise (S/N) ratio that is a ratio of the second average intensity to the first average intensity; determiner 116 that determines an estimating equation to be used for evaluation of the oral function of evaluatee U; calculator 130 that calculates an estimate value of the oral function of evaluatee U, based on the estimating equation determined and the one or more features extracted; and evaluator 140 that evaluates the deterioration state of the oral function of evaluatee U by assessing the estimate value using an oral function evaluation indicator, wherein determiner 116: determines a first estimating equation as the estimating equation when the S/N ratio calculated is greater than a first threshold, the first estimating equation being an estimating equation that includes a feature related to sound pressure among the one or more features extracted from the voice data; and determines a second estimating equation as the estimating equation when the S/N ratio calculated is less than or equal to the first threshold, the second estimating equation being an estimating equation that does not include the feature related to sound pressure.

Accordingly, it is possible to assess, based on the S/N ratio, whether it is suitable to use a feature related to sound pressure, and determine, according to the assessment, whether to use the first estimating equation that includes the feature related to sound pressure or the second estimating equation that does not include the feature related to sound pressure. This makes it possible to evaluate the deterioration state of oral function of evaluatee U using an appropriate estimating equation in terms of whether or not a feature related to sound pressure is included. In other words, appropriate use of a feature related to sound pressure enables more accurate evaluation of oral function of evaluatee U.

For example, the oral function of evaluatee U may be at least one of tongue fur, oral dryness, occlusal force, tongue pressure, cheek pressure, a remaining number of teeth, swallowing function, or mastication function of the evaluatee.

Accordingly, it is possible to evaluate a deterioration state of at least one of tongue fur, oral dryness, occlusal force, tongue pressure, cheek pressure, the remaining number of teeth, swallowing function, or mastication function of evaluatee U.

For example, the first estimating equation and the second estimating equation may be set for each of tongue fur, oral dryness, occlusal force, tongue pressure, cheek pressure, a remaining number of teeth, swallowing function, and mastication function of evaluatee U.

Accordingly, for each of tongue fur, oral dryness, occlusal force, tongue pressure, cheek pressure, the remaining number of teeth, swallowing function, and mastication function of evaluatee U, it is determined whether use of the first estimating equation is suitable or use of the second estimating equation is suitable, and the deterioration state of oral function can be evaluated taking the determination result into account.

For example, oral function evaluation device 100 may further include information outputter 180 that outputs information for increasing the S/N ratio when the S/N ratio calculated is less than or equal to a second threshold that is less than the first threshold.

Accordingly, when a deterioration state of oral function is about to be evaluated in an unsuitable environment with an even lower S/N ratio, improvement of the environment can be prompted, and it is therefore possible to inhibit evaluation of a deterioration state of oral function in such an unsuitable environment.

For example, the information may recommend at least one of: checking a connection status of a sound collection device (microphone) used for collecting a voice uttered by evaluatee U; increasing the volume of a voice of evaluatee U; or reducing an environmental sound when evaluatee U utters a voice.

Accordingly, it is possible to recommend at least one of: checking the connection status of a sound collection device (microphone) used for collecting a voice uttered by evaluatee U; increasing the volume of a voice of evaluatee U; or reducing the environmental sound when evaluatee U utters a voice.

For example, obtainer 110 may obtain, as the voice data, first voice data that is not to be used for the evaluation of the oral function of evaluatee U, and S/N ratio calculator 115 may calculate the S/N ratio using the first voice data obtained.

Accordingly, the S/N ratio can be calculated using the first voice data that is not to be used for the evaluation of the oral function of evaluatee U.

For example, obtainer 110 may obtain, as the voice data, second voice data that is to be used for the evaluation of the oral function of evaluatee U, and S/N ratio calculator 115 may calculate the S/N ratio using the second voice data obtained.

Accordingly, the S/N ratio can be calculated using the second voice data that is to be used for the evaluation of the oral function of evaluatee U.

For example, oral function evaluation device 100 may further include suggester 160 that provides a suggestion regarding the oral function of evaluatee U by checking the estimate value against predetermined data.

Accordingly, evaluatee U can receive a suggestion on what measures should be taken when the oral function deteriorates.

For example, oral function evaluation device 100 may further include a sound collection device (microphone) used for collecting a voice uttered by evaluatee U; and a presentation device (mobile terminal 300) that presents the deterioration state of the oral function of evaluatee U evaluated.

Furthermore, for example, oral function evaluation device 100 may include: obtainer 110 that obtains voice data obtained by collecting a voice of evaluatee U uttering a phrase or a fixed sentence that includes (i) two or more morae including a change in a first formant frequency or a change in a second formant frequency or (ii) at least one of a flap, a plosive, a voiceless sound, a double consonant, or a fricative; extractor 120 that extracts a prosody feature from the voice data obtained; calculator 130 that calculates an estimate value of oral function of evaluatee U, based on the prosody feature extracted and an oral function estimating equation calculated based on a plurality of training data items; and evaluator 140 that evaluates a deterioration state of oral function of evaluatee U by assessing the estimate value using an oral function evaluation indicator.

Accordingly, it is possible to provide oral function evaluation device 100 capable of evaluating oral function of evaluatee U in a simple and easy manner.

Oral function evaluation system 200 according to the present embodiment is oral function evaluation system 200 that evaluates a deterioration state of oral function of evaluatee U from a voice uttered by evaluatee U, oral function evaluation system 200 including: a terminal (mobile terminal 300); and oral function evaluation device 100 connected to the terminal, wherein the terminal includes: a sound collection device (microphone) used for collecting a voice uttered by evaluatee U; and a presentation device (part of mobile terminal 300) that presents the deterioration state of the oral function of evaluatee U evaluated, oral function evaluation device 100 includes: obtainer 110 that obtains voice data obtained by collecting the voice uttered by evaluatee U; extractor 120 that extracts one or more features from the voice data obtained; S/N ratio calculator 115 that, using the voice data obtained, calculates a first average intensity of a sound collected in a period in which evaluatee U does not utter a voice and a second average intensity of a sound collected in a period in which evaluatee U utters a voice, and calculates a signal-to-noise (S/N) ratio that is a ratio of the second average intensity to the first average intensity; determiner 116 that determines an estimating equation to be used for evaluation of the oral function of evaluatee U; calculator 130 that calculates an estimate value of the oral function of evaluatee U, based on the estimating equation determined and the one or more features extracted; and evaluator 140 that evaluates the deterioration state of the oral function of evaluatee U by assessing the estimate value using an oral function evaluation indicator, and determiner 116: determines a first estimating equation as the estimating equation when the S/N ratio calculated is greater than a first threshold, the first estimating equation being an estimating equation that includes a feature related to sound pressure among the one or more features extracted from the voice data; and determines a second estimating equation as the estimating equation when the S/N ratio calculated is less than or equal to the first threshold, the second estimating equation being an estimating equation that does not include the feature related to sound pressure.

Accordingly, it is possible to provide oral function evaluation system 200 capable of evaluating oral function more accurately.

Furthermore, oral function evaluation system 200 may include, for example, oral function evaluation device 100 and a sound collection device (mobile terminal 300) that collects in a contactless manner a voice of evaluatee U uttering a phrase or a fixed sentence.

Accordingly, it is possible to provide oral function evaluation system 200 capable of evaluating oral function of evaluatee U in a simple and easy manner.

OTHER EMBODIMENTS

The oral function evaluation method and so on according to the present embodiment have been described above, but the present invention is not limited to the above embodiment.

For example, the candidate estimating equations may be updated based on an evaluation result obtained by a specialist actually diagnosing oral function of evaluatee U. Accordingly, precision of the evaluation of oral function can be increased. Machine learning may be used to increase the precision of the evaluation of oral function.

For example, the details of suggestion may be evaluated by evaluatee U, and suggestion data 173 may be updated based on the evaluation result. For example, in the case where a suggestion is provided regarding oral function that is unproblematic for evaluatee U, evaluatee U evaluates the details of the suggestion as wrong. By updating suggestion data 173 based on this evaluation result, a wrong suggestion such as the one above is inhibited from being provided. This way, the details of a suggestion regarding oral function for evaluatee U can be made more effective. It should be noted that machine learning may be used to make the details of a suggestion regarding oral function more effective.

For example, evaluation results on oral function may be accumulated together with personal information items as big data, and the big data may be used for machine learning. Furthermore, the details of suggestions regarding oral function may be accumulated together with personal information items as big data, and the big data may be used for machine learning.

Further, for example, although the oral function evaluation method in the above embodiment includes providing a suggestion regarding oral function (step S107), this process need not be included. In other words, oral function evaluation device 100 need not include suggester 160.

Further, for example, although the personal information on evaluatee U is obtained in the obtaining of voice data (step S102) in the above embodiment, the personal information on evaluatee U need not be obtained. In other words, obtainer 110 need not obtain the personal information on evaluatee U.

Furthermore, for example, the steps included in the oral function evaluation method may be executed by a computer (computer system). The present invention can be implemented as a program for causing a computer to execute the steps included in the oral function evaluation method. In addition, the present invention can be implemented as a non-transitory computer-readable recording medium such as a CD-ROM having such a program recorded thereon.

For example, in the case where the present invention is implemented using a program (software product), each step is performed as a result of the program being executed using hardware resources such as a CPU, memory, and an input and output circuit of a computer. That is to say, each step is performed by the CPU obtaining data from, for example, the memory or the input and output circuit and performing calculation on the data, and outputting the calculation result to the memory or the input and output circuit, for example.

Further, each of the constituent elements included in oral function evaluation device 100 and oral function evaluation system 200 according to the above embodiment may be implemented as a dedicated or general-purpose circuit.

Further, each of the constituent elements included in oral function evaluation device 100 and oral function evaluation system 200 according to the above embodiment may be implemented as a large-scale integrated (LSI) circuit, which is an integrated circuit (IC).

The integrated circuit is not limited to an LSI and may be implemented as a dedicated circuit or a general-purpose processor. A field programmable gate array (FPGA) that allows for programming, or a reconfigurable processor that allows for reconfiguration of the connection and the setting of circuit cells inside an LSI may be employed.

Furthermore, when advancement in semiconductor technology or derivatives of other technologies brings forth a circuit integration technology which replaces LSI, such a circuit integration technology may be used to integrate the constituent elements included in oral function evaluation device 100 and oral function evaluation system 200.

The present invention also includes other forms achieved by making various modifications to the embodiments that may be conceived by those skilled in the art, as well as forms implemented by arbitrarily combining the constituent elements and functions in each embodiment without materially departing from the essence of the present invention.

The invention claimed is:

1. An oral function evaluation device that evaluates a deterioration state of oral function of an evaluatee from a voice uttered by the evaluatee, the oral function evaluation device comprising:

an obtainer that obtains voice data obtained by collecting a voice uttered by the evaluatee;

an extractor that extracts one or more features from the voice data obtained;

an S/N ratio calculator that, using the voice data obtained, calculates a first average intensity of a sound collected in a period in which the evaluatee does not utter a voice and a second average intensity of a sound collected in a period in which the evaluatee utters a voice, and calculates a signal-to-noise (S/N) ratio that is a ratio of the second average intensity to the first average intensity;

a determiner that determines an estimating equation to be used for evaluation of the oral function of the evaluatee;

a calculator that calculates an estimate value of the oral function of the evaluatee, based on the estimating equation determined and the one or more features extracted; and an evaluator that evaluates the deterioration state of the oral function of the evaluatee by assessing the estimate value using an oral function evaluation indicator, wherein the determiner:

determines a first estimating equation as the estimating equation when the S/N ratio calculated is greater than a first threshold, the first estimating equation being an estimating equation that includes a feature related to sound pressure among the one or more features extracted from the voice data; and determines a second estimating equation as the estimating equation when the S/N ratio calculated is less than or equal to the first threshold, the second estimating equation being an estimating equation that does not include the feature related to sound pressure.

2. The oral function evaluation device according to claim 1, wherein the oral function of the evaluatee is at least one of tongue fur, oral dryness, occlusal force, tongue pressure, cheek pressure, a remaining number of teeth, swallowing function, or mastication function of the evaluatee.

3. The oral function evaluation device according to claim 1, wherein the first estimating equation and the second estimating equation are set for each of tongue fur, oral dryness, occlusal force, tongue pressure, cheek pressure, a remaining number of teeth, swallowing function, and mastication function of the evaluatee.

4. The oral function evaluation device according to claim 1, further comprising:

an information outputter that outputs information for increasing the S/N ratio when the S/N ratio calculated is less than or equal to a second threshold that is less than the first threshold.

5. The oral function evaluation device according to claim 4, wherein the information recommends at least one of: checking a connection status of a sound collection device used for collecting a voice uttered by the evaluatee; increasing a volume of a voice of the evaluatee; or reducing an environmental sound when the evaluatee utters a voice.

6. The oral function evaluation device according to claim 4, wherein the obtainer obtains, as the voice data, first voice data that is not to be used for the evaluation of the oral function of the evaluatee, and the S/N ratio calculator calculates the S/N ratio using the first voice data obtained.

7. The oral function evaluation device according to claim 4, wherein the obtainer obtains, as the voice data, second voice data that is to be used for the evaluation of the oral function of the evaluatee, and the S/N ratio calculator calculates the S/N ratio using the second voice data obtained.

8. The oral function evaluation device according to claim 1, further comprising:

a suggester that provides a suggestion regarding the oral function of the evaluatee by checking the estimate value against predetermined data.

9. The oral function evaluation device according to claim 8, further comprising:

a sound collection device used for collecting a voice uttered by the evaluatee; and a presentation device that presents the deterioration state of the oral function of the evaluatee evaluated.

10. An oral function evaluation system that evaluates a deterioration state of oral function of an evaluatee from a voice uttered by the evaluatee, the oral function evaluation system comprising:

a terminal; and an oral function evaluation device connected to the terminal, wherein the terminal includes:

a sound collection device used for collecting a voice uttered by the evaluatee; and a presentation device that presents the deterioration state of the oral function of the evaluatee evaluated, the oral function evaluation device includes:

an obtainer that obtains voice data obtained by collecting the voice uttered by the evaluatee;

an extractor that extracts one or more features from the voice data obtained;

an S/N ratio calculator that, using the voice data obtained, calculates a first average intensity of a sound collected in a period in which the evaluatee does not utter a voice and a second average intensity of a sound collected in a period in which the evaluatee utters a voice, and calculates a signal-to-noise (S/N) ratio that is a ratio of the second average intensity to the first average intensity;

a determiner that determines an estimating equation to be used for evaluation of the oral function of the evaluatee;

a calculator that calculates an estimate value of the oral function of the evaluatee, based on the estimating equation determined and the one or more features extracted; and an evaluator that evaluates the deterioration state of the oral function of the evaluatee by assessing the estimate value using an oral function evaluation indicator, and the determiner:

determines a first estimating equation as the estimating equation when the S/N ratio calculated is greater than a first threshold, the first estimating equation being an estimating equation that includes a feature related to sound pressure among the one or more features extracted from the voice data; and determines a second estimating equation as the estimating equation when the S/N ratio calculated is less than or equal to the first threshold, the second estimating equation being an estimating equation that does not include the feature related to sound pressure.

11. An oral function evaluation method of evaluating a deterioration state of oral function of an evaluatee from a voice uttered by the evaluatee, the oral function evaluation method being a method to be performed by a terminal and an oral function evaluation device and comprising:

obtaining voice data by the terminal collecting a voice uttered by the evaluatee;

obtaining, by the oral function evaluation device, the voice data;

extracting, by the oral function evaluation device, one or more features from the voice data obtained;

calculating, by the oral function evaluation device, using the voice data obtained, a first average intensity of a sound collected in a period in which the evaluatee does not utter a voice and a second average intensity of a sound collected in a period in which the evaluatee utters a voice, and calculating an S/N ratio that is a ratio of the second average intensity to the first average intensity;

determining, by the oral function evaluation device, an estimating equation to be used for evaluation of the oral function of the evaluatee;

calculating, by the oral function evaluation device, an estimate value of the oral function of the evaluatee, based on the estimating equation determined and the one or more features extracted;

evaluating, by the oral function evaluation device, the deterioration state of the oral function of the evaluatee by assessing the estimate value using an oral function evaluation indicator; and presenting, by the terminal, the deterioration state of the oral function of the evaluatee evaluated, wherein the determining of the estimating equation includes:

determining a first estimating equation as the estimating equation when the S/N ratio calculated is greater than a first threshold, the first estimating equation being an estimating equation that includes a feature related to sound pressure among the one or more features extracted from the voice data; and determining a second estimating equation as the estimating equation when the S/N ratio calculated is less than or equal to the first threshold, the second estimating equation being an estimating equation that does not include the feature related to sound pressure.

* * * * *